United States Patent
Yamada

(10) Patent No.: US 9,167,469 B2
(45) Date of Patent: *Oct. 20, 2015

(54) COORDINATED MULTIPOINT (COMP) RADIO RESOURCE MANAGEMENT (RRM) MEASUREMENT

(71) Applicant: Sharp Laboratories of America, Inc., Camas, WA (US)

(72) Inventor: Shohei Yamada, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/280,109

(22) Filed: May 16, 2014

(65) Prior Publication Data

US 2014/0247741 A1 Sep. 4, 2014

Related U.S. Application Data

(63) Continuation of application No. 13/433,218, filed on Mar. 28, 2012, now Pat. No. 8,767,581.

(51) Int. Cl.
*H04W 24/00* (2009.01)
*H04W 24/10* (2009.01)
*H04B 7/02* (2006.01)
*H04L 5/00* (2006.01)

(52) U.S. Cl.
CPC ............... *H04W 24/10* (2013.01); *H04B 7/024* (2013.01); *H04L 5/0091* (2013.01); *H04W 24/00* (2013.01); *H04L 5/001* (2013.01)

(58) Field of Classification Search
CPC ....... H04L 5/0091; H04L 43/50; H04L 47/30; H04L 12/5602; H04W 47/30; H04W 28/04
USPC ............ 455/422.1, 452.1; 370/252, 329, 253
See application file for complete search history.

(56) References Cited

U.S. PATENT DOCUMENTS

| 2013/0148515 A1 | 6/2013 | Ribeiro et al. |
| 2013/0170474 A1 | 7/2013 | Bi et al. |

FOREIGN PATENT DOCUMENTS

| WO | 2011/100520 | 8/2011 |
| WO | 2011/129583 | 10/2011 |

(Continued)

OTHER PUBLICATIONS

Samsung, "CoMP Architecture and CoMP RRM Measurement," 3GPP TSG-RAN WG2 Meeting #76, R2-116070, Nov. 2011.

(Continued)

*Primary Examiner* — Phuoc H Doan
(74) *Attorney, Agent, or Firm* — Austin Rapp & Hardman

(57) ABSTRACT

A method performed by a user equipment (UE) is described. A measurement configuration is received from an evolved NodeB (eNB). The measurement configuration comprises a measurement object in a carrier frequency and the measurement object comprises a set of channel state information reference signal (CSI-RS) configurations. A measurement is performed based on a cell-specific reference signal (CRS). A measurement is performed based on a channel state information reference signal (CSI-RS) based on the measurement configuration. A measurement report is generated in a radio resource control (RRC) layer. The measurement report is sent to the eNB.

12 Claims, 23 Drawing Sheets

(56) References Cited

FOREIGN PATENT DOCUMENTS

WO 2012/107986 8/2012
WO 2013/018854 2/2013

OTHER PUBLICATIONS

3GPP TS 36.300 V8.5.0, "Evolved Universal Terrestrial Radio Access (E-UTRA) and Evolved Universal Terrestrial Radio Access Network (E-UTRAN); Overall Description; Stage 2 (Release 8)," May 2008.
3GPP TS 36.211 V9.0.0, "Evolved Universal Terrestrial Radio Access (E-UTRA); Physical Channels and Modulation (Release 9)," Dec. 2009.
3GPP TS 36.213 V8.6.0, "Evolved Universal Terrestrial Radio Access (E-UTRA); Physical Layer Procedures (Release 8)," Mar. 2009.
3GPP TS 36.331 V9.1.0, "Evolved Universal Terrestrial Radio Access (E-UTRA) Radio Resource Control (RRC); Protocol Specification (Release 9)," Dec. 2009.
3GPP TS 36.212 V9.0.0, "Evolved Universal Terrestrial Radio Access (E-UTRA); Multiplexing and Channel Coding (Release 9)," Dec. 2009.
3GPP TS 36.321 V8.0.0, "Technical Specification Group Radio Access Network; Evolved Universal Terrestrial Radio Access (E-UTRA) Medium Access Control (MAC) Protocol Specification (Release 8)," Dec. 2007.
Intel Corporation, "Configuration of CSI-RS Based CoMP RRM Measurements," 3GPP TSG-RAN WG2 #77bis, R2-121749, Mar. 2012.
Ericsson, ST-Ericsson, "Measurement Framework Based on CSI-RS," 3GPP TSG-RAN WG2 #77bis, R2-121420, Mar. 2012.
New Postcom, "Considerations on CoMP Measurement Management," 3GPP TSG RAN WG2 Meeting #77bis, R2-121188, Mar. 2012.
Pantech, "UE Side Measurement and Reporting for CoMP Measurement Set Control," 3GPP TSG RAN Working Group 1 Meeting #68, R1-120319, Feb. 2012.
3GPP TS 36.331 V10.5.0, "Evolved Universal Terrestrial Radio Access (E-UTRA) Radio Resource Control (RRC); Protocol Specification (Release 10)," Mar. 2012.
Huawei, HiSilicon, "Measurement Configuration for CSI-RS Based Measurement for CoMP," 3GPP TSG-RAN WG2 Meeting #77bis, R2-121646, Mar. 2012.
Ericsson, ST-Ericsson, "Further Details on CSI RS Configuration," 3GPP TSG-RAN WG1 #62bis, R1-105322, Oct. 2010.
International Search Report issued for International Patent Application No. PCT/JP2013/000821 on Mar. 12, 2013.
Office Action issued for U.S. Appl. No. 13/433,218 on Nov. 7, 2013.
Notice of Allowance issued for U.S. Appl. No. 13/433,218 on Feb. 14, 2014.

COORDINATED MULTIPOINT (COMP) RADIO RESOURCE MANAGEMENT (RRM) MEASUREMENT

RELATED APPLICATIONS

This application is a continuation of U.S. patent application Ser. No. 13/433,218 entitled "COORDINATED MULTIPOINT (COMP) RADIO RESOURCE MANAGEMENT (RRM) MEASUREMENT," filed Mar. 28, 2012, which is incorporated herein by reference.

TECHNICAL FIELD

The present invention relates generally to wireless communications and wireless communications-related technology. More specifically, the present invention relates to systems and methods for coordinated multipoint (CoMP) radio resource management (RRM) measurement.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of cells, each of which may be serviced by a base station. A base station may be a fixed station that communicates with mobile stations.

Various signal processing techniques may be used in wireless communication systems to improve efficiency and quality of wireless communication. In Rel-10, multiple component carriers (CCs) were introduced. The use of coordinated multipoint (CoMP) transmission is considered a major enhancement to Long Term Evolution (LTE) Release 11. Benefits may be realized by improvements to the use of coordinated multipoint (CoMP) transmission. Benefits may also be realized by improved methods for reporting measurement results by a wireless communication device.

DETAILED DESCRIPTION

Figure 1:
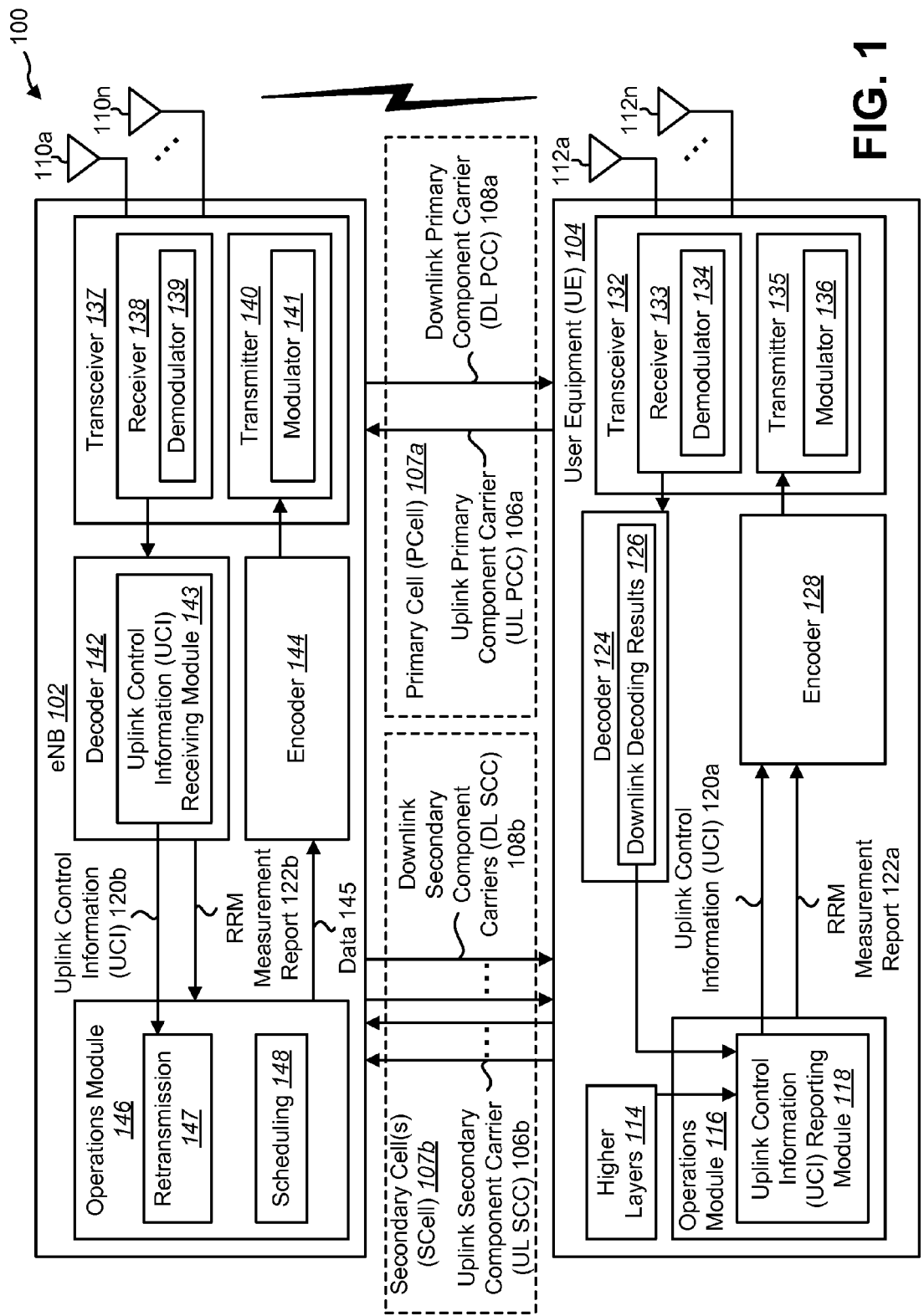
FIG. 1 is a block diagram illustrating a wireless communication system using uplink control information (UCI) multiplexing.

A method for measurement reporting is described. A measurement configuration is received from an evolved Node B (eNB). The measurement configuration includes a single measurement object in a carrier frequency. A measurement report for a channel state information reference signal (CSI-RS) is generated based on the measurement configuration. The measurement report is sent to the eNB.

The method may be performed by a user equipment (UE). The measurement object may include a set of channel state information reference signal (CSI-RS) configurations for reference signal received power (RSRP) measurement. The measurement object may also include a set of channel state information reference signal (CSI-RS) configurations for reference signal received quality (RSRQ) measurement. A radio resource configuration of the measurement object may include a set of channel state information reference signal (CSI-RS) configurations. The set of CSI-RS configurations may be used for channel quality measurement in a physical layer. The set of CSI-RS configurations may also be used for channel quality reporting in a physical layer.

The measurement object may include a report configuration. The report configuration may indicate that the measurement object corresponds to one of a cell-specific reference signal (CRS) and a channel state information reference signal (CSI-RS). The measurement object may include a measurement object. The measurement object may indicate that the measurement object corresponds to one of a cell-specific reference signal (CRS) and a channel state information reference signal (CSI-RS).

Each measurement configuration may include multiple measurement IDs, multiple measurement objects and multiple report configurations. Each measurement ID may be linked to a measurement object and a report configuration. A measurement object configuration of the measurement configuration may include one or more sets of channel state information reference signal (CSI-RS) configurations.

The measurement configuration may include a measurement object that includes an information element configured to perform at least one of adding to the sets of CSI-RS configurations, modifying the sets of CSI-RS configurations and removing from the sets of CSI-RS configurations. Each measurement object may correspond to a specific carrier frequency. Each measurement object may also correspond to one of cell-specific reference signal (CRS) based RRM measurement or CSI-RS based RRM measurement.

A physical configuration of the measurement configuration may include one or more sets of channel state information reference signal (CSI-RS) configurations. The physical configuration may include an information element configured to perform at least one of adding to the sets of CSI-RS configurations, modifying the sets of CSI-RS configurations and removing from the sets of CSI-RS configurations.

A method for measurement reporting is also described. Measurement settings for a channel state information reference signal (CSI-RS) are determined for a user equipment (UE). A measurement configuration for the UE is generated. The measurement configuration includes a single measurement object in a carrier frequency. The measurement configuration is sent to the UE.

The method may be performed by an eNB.

A user equipment (UE) configured for measurement reporting is described. The user equipment (UE) includes a processor, memory in electronic communication with the processor and instructions stored in the memory. The instructions are executable to receive a measurement configuration from an evolved Node B (eNB). The measurement configuration includes a single measurement object in a carrier frequency. The instructions are also executable to generate a measurement report for a channel state information reference signal (CSI-RS) based on the measurement configuration. The instructions are further executable to send the measurement report to the eNB.

An evolved NodeB (eNB) configured for measurement reporting is also described. The eNB includes a processor, memory in electronic communication with the processor and instructions stored in the memory. The instructions are executable to determine measurement settings for a channel state information reference signal (CSI-RS) for a user equipment (UE). The instructions are also executable to generate a measurement configuration for the UE. The measurement configuration includes a single measurement object in a carrier frequency. The instructions are further executable to send the measurement configuration to the UE.

The 3rd Generation Partnership Project, also referred to as "3GPP," is a collaboration agreement that aims to define globally applicable technical specifications and technical reports for third and fourth generation wireless communication systems. The 3GPP may define specifications for the next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE and LTE-Advanced standards (e.g., Release-8, Release-9, Release-10 and Release-11). However, the scope of the present disclosure should not be limited in this regard. At least some aspects of the systems and methods disclosed herein may be utilized in other types of wireless communication systems.

In LTE Release-11, the use of coordinated multipoint (CoMP) transmission is a major enhancement. In coordinated multipoint (CoMP) transmission, a user equipment (UE) may be able to receive downlink signals from multiple geographically separated antennas (referred to herein as points). Points may be located on the same base station or on different base stations. Points may be connected to a base station but be in a different physical location than the base station. Furthermore, uplink transmissions by the user equipment (UE) may be received by the multiple points. Sectors of the same site may correspond to different points.

Each point may be controlled by an eNB. There may be one or multiple eNBs. One of the eNBs may be referred to as the serving eNB. The serving eNB may perform most of the processing, such as baseband processing and scheduling. Because some of the antennas might be collocated at an eNB, the eNB may also be a point. The serving eNB may control one or multiple cells. One cell may be designated as the serving cell. The designation of a cell as the serving cell may dynamically change over time. One or more points may be used for transmission or reception in each cell.

An antenna port may be defined such that the channel over which a symbol on the antenna port is conveyed can be inferred from the channel over which another symbol on the same antenna port is conveyed. There may be one resource grid (time-frequency) per antenna port. The antenna port can realize multiple layers for a multiple-input and multiple-output (MIMO) system. The points may be transparent to the user equipment (UE). To a user equipment (UE), antenna ports are distinguishable. An antenna port may be realized by an antenna or set of antennas in one point or a set of antennas in different points. However, points are distinguishable from the perspective of an eNB. Therefore, in a transmission from a point to the user equipment (UE), from the perspective of the eNB, the eNB knows which point(s) are used for an antenna port participating in the transmission.

By coordinating the downlink transmissions from each point to the user equipment (UE), the downlink performance can be significantly increased. Likewise, by coordinating the uplink transmissions from the user equipment (UE), the multiple points may take advantage of the multiple receptions to significantly improve the uplink performance. In coordinated multipoint (CoMP) transmissions, the channel state information (CSI) of each coordinated point may be reported separately or jointly with the same format as Release-10 or new formats.

The use of coordinated multipoint (CoMP) transmission may increase uplink and downlink data transmission rates while ensuring consistent service quality and throughput on LTE wireless broadband networks and 3G networks. Coordinated multipoint (CoMP) transmission may be used on both the uplink and the downlink.

Two major coordinated multipoint (CoMP) transmission methods are under consideration: coordinated scheduling/coordinated beamforming (CS/CB) and joint processing (JP). In coordinated scheduling/coordinated beamforming (CS/CB), the scheduling of the transmission (including beamforming functionality) may be dynamically coordinated between the points (i.e., the points in a serving coordinated multipoint (CoMP) cooperating set) to control/reduce the interference between different coordinated multipoint (CoMP) and non-coordinated multipoint (CoMP) transmissions. In joint processing (JP) (also referred to as joint transmission (JT)), the data may be transmitted by only one transmission point to the user equipment (UE). Dynamic point selection (DPS), including dynamic point blanking, may also be used.

The term "simultaneous" may be used herein to denote a situation where two or more events occur in overlapping time frames. In other words, two "simultaneous" events may overlap in time to some extent, but are not necessarily of the same duration. Furthermore, simultaneous events may or may not begin or end at the same time.

FIG. 1 is a block diagram illustrating a wireless communication system 100 using uplink control information (UCI) multiplexing. An eNB 102 may be in wireless communication with one or more user equipments (UEs) 104. An eNB 102 may be referred to as an access point, a Node B, an evolved Node B, a base station or some other terminology. Likewise, a user equipment (UE) 104 may be referred to as a mobile station, a subscriber station, an access terminal, a remote station, a user terminal, a terminal, a handset, a subscriber unit, a wireless communication device, or some other terminology.

Communication between a user equipment (UE) 104 and an eNB 102 may be accomplished using transmissions over a wireless link, including an uplink and a downlink. The uplink refers to communications sent from a user equipment (UE) 104 to an eNB 102. The downlink refers to communications sent from an eNB 102 to a user equipment (UE) 104. The communication link may be established using a single-input and single-output (SISO), multiple-input and single-output (MISO), single-input and multiple-output (SIMO) or a multiple-input and multiple-output (MIMO) system. A MIMO system may include both a transmitter and a receiver equipped with multiple transmit and receive antennas. Thus, an eNB 102 may have multiple antennas 110a-n and a user equipment (UE) 104 may have multiple antennas 112a-n. In this way, the eNB 102 and the user equipment (UE) 104 may each operate as either a transmitter or a receiver in a MIMO system. One benefit of a MIMO system is improved performance if the additional dimensionalities created by the multiple transmit and receive antennas are utilized.

The user equipment (UE) 104 communicates with an eNB 102 using one or more antenna ports, which may be realized by one or more physical antennas 112a-n. The user equipment (UE) 104 may include a transceiver 132, a decoder 124, an encoder 128 and an operations module 116. The transceiver 132 may include a receiver 133 and a transmitter 135. The receiver 133 may receive signals from the eNB 102 using one or more antennas 112a-n. For example, the receiver 133 may receive and demodulate received signals using a demodulator 134. The transmitter 135 may transmit signals to the eNB 102 using one or more antenna ports, which may be realized by one or more physical antennas 112a-n. For example, the transmitter 135 may modulate signals using a modulator 136 and transmit the modulated signals.

The receiver 133 may provide a demodulated signal to the decoder 124. The user equipment (UE) 104 may use the decoder 124 to decode signals and make downlink decoding results 126. The downlink decoding results 126 may indicate whether data was received correctly. For example, the downlink decoding results 126 may indicate whether a packet was correctly or erroneously received (i.e., positive acknowledgement, negative acknowledgement or discontinuous transmission (no signal)).

The operations module 116 may be a software and/or hardware module used to control user equipment (UE) 104 communications. For example, the operations module 116 may determine when the user equipment (UE) 104 requires resources to communicate with an eNB 102.

In $3^{rd}$ Generation Partnership Project (3GPP) Long Term Evolution (LTE)—Advanced, additional control feedback will have to be sent on control channels to accommodate MIMO and carrier aggregation. Carrier aggregation refers to transmitting data on multiple component carriers (CCs) (or cells) that are contiguously or separately located. Both the hybrid automatic repeat and request (ARQ) acknowledgement (HARQ-ACK) with positive-acknowledge and negative-acknowledge (ACK/NACK) bits and other control information may be transmitted using the physical uplink control channel (PUCCH) or the physical uplink shared channel (PUSCH). In carrier aggregation (CA), only one uplink component carrier (CC) (or cell) (i.e., PCC or PCell) may be utilized for transmission using the physical uplink control channel (PUCCH). A component carrier (CC) is a carrier frequency to which cells belong.

The user equipment (UE) 104 may transmit uplink control information (UCI) 120a to an eNB 102 on the uplink. The uplink control information (UCI) 120a may include a channel state information (CSI), a scheduling request (SR) and a hybrid automatic repeat request acknowledgement (HARQ-ACK). HARQ-ACK means ACK (positive-acknowledgement) and/or NACK (negative-acknowledgement) and/or DTX (discontinuous transmission) responses for HARQ operation, also known as ACK/NACK. If a transmission is successful, the HARQ-ACK may have a logical value of 1 and if the transmission is unsuccessful, the HARQ-ACK may have a logical value of 0.

The channel state information (CSI) includes a channel quality indicator (CQI), a precoding matrix indicator (PMI), a precoding type indicator (PTI) and/or rank indication (RI).

The uplink control information (UCI) 120a may be generated by the uplink control information (UCI) reporting module 118 and transferred to an encoder 128. The operations module 116 may also generate radio resource management (RRM) measurement reports 122a. The radio resource management (RRM) measurement report 122a may be provided to the encoder 128. The encoder 128 may then provide the uplink control information (UCI) 120 for transmission and the radio resource management (RRM) report 122a to the transmitter 135. In one configuration, the radio resource management (RRM) report 122a may be processed in the radio resource control (RRC) layer and the uplink control information (UCI) 120a may be processed in the physical (PHY) layer.

The time and frequency resources may be quantized to create a grid known as the time-frequency grid. In the time domain, 10 milliseconds (ms) is referred to as one radio frame. One radio frame may include 10 subframes, each with a duration of 1 ms, which is the duration of transmission in the uplink and/or downlink. Every subframe may be divided into two slots, each with a duration of 0.5 ms. Each slot may be divided into 7 symbols. The frequency domain may be divided into bands with a 15 kilohertz (kHz) width, referred to as a subcarrier. One resource element has a duration of one symbol in the time domain and the bandwidth of one subcarrier in the frequency domain.

The minimum amount of resource that can be allocated for the transmission of information in the uplink or downlink in any given subframe is two resource blocks (RBs), with one RB at each slot. One RB has a duration of 0.5 ms (7 symbols or one slot) in the time domain and a bandwidth of 12 subcarriers (180 kHz) in the frequency domain. At any given subframe, a maximum of two RBs (one RB at each slot) can be used by a given user equipment (UE) 104 for the transmission of uplink control information (UCI) in the physical uplink control channel (PUCCH).

In LTE Release-8, only one uplink component carrier (CC) 106 or cell 107 and one downlink component carrier (CC) 108 or cell 107 can be used for transmission to and reception from each user equipment (UE) 104.

In 3GPP Long Term Evolution (LTE) Release-10 (LTE-A or Advanced EUTRAN), carrier aggregation was introduced. Carrier aggregation may also be referred to as cell aggregation. Carrier aggregation is supported in both the uplink and the downlink with up to five component carriers (CCs) 106, 108. Each component carrier (CC) 106, 108 or cell 107 may have a transmission bandwidth of up to 110 resource blocks (i.e., up to 20 megahertz (MHz)). In carrier aggregation, two or more component carriers (CCs) 106, 108 are aggregated to support wider transmission bandwidths up to one hundred megahertz (MHz). A user equipment (UE) 104 may simultaneously receive and/or transmit on one or multiple component carriers (CCs) 106, 108, depending on the capabilities of the user equipment (UE) 104.

A user equipment (UE) 104 may communicate with an eNB 102 using multiple component carriers (CCs) 108 at the same time. For example, a user equipment (UE) 104 may communicate with an eNB 102 using a primary cell (PCell) 107a while simultaneously communicating with the eNB 102 using secondary cell(s) (SCell) 107b. Similarly, an eNB 102 may communicate with a user equipment (UE) 104 using multiple component carriers (CCs) 108 at the same time. For example, an eNB 102 may communicate with a user equipment (UE) 104 using a primary cell (PCell) 107a while simultaneously communicating with the user equipment (UE) 104 using secondary cell(s) (SCell) 107b.

An eNB 102 may include a transceiver 137 that includes a receiver 138 and a transmitter 140. An eNB 102 may additionally include a decoder 142, an encoder 144 and an operations module 146. An eNB 102 may receive uplink control information (UCI) 120b and radio resource management (RRM) measurement reports 122b using its one or more antenna ports, which may be realized by one or more physical antennas 110a-n, and its receiver 138. The receiver 138 may use the demodulator 139 to demodulate the uplink control information (UCI) 120b and the radio resource management (RRM) measurement reports 122b.

The decoder 142 may include an uplink control information (UCI) receiving module 143. An eNB 102 may use the uplink control information (UCI) receiving module 143 to decode and interpret the uplink control information (UCI) 120b received by the eNB 102. The eNB 102 may use the decoded uplink control information (UCI) 120b to perform certain operations, such as retransmit one or more packets based on scheduled communication resources for the user equipment (UE) 104. The decoder 142 may also decode the radio resource management (RRM) measurement report 122b. The radio resource management (RRM) measurement report 122b may be defined for the purpose of inter-cell mobility management in the radio resource control (RRC) layer. The radio resource management (RRM) measurement report 122b may be used to efficiently select coordinated multipoint (CoMP) transmission points and/or to select efficient channel state information (CSI) measurement sets in the physical layer.

The operations module 146 may include a retransmission module 147 and a scheduling module 148. The retransmission module 147 may determine which packets to retransmit (if any) based on the uplink control information (UCI) 120b. The scheduling module 148 may be used by the eNB 102 to schedule communication resources (e.g., bandwidth, time slots, frequency channels, spatial channels, etc.). The scheduling module 148 may use the uplink control information (UCI) 120b to determine whether (and when) to schedule communication resources for the user equipment (UE) 104.

The operations module 146 may provide data 145 to the encoder 144. For example, the data 145 may include packets for retransmission and/or a scheduling grant for the user equipment (UE) 104. The encoder 144 may encode the data 145, which may then be provided to the transmitter 140. The transmitter 140 may modulate the encoded data using the modulator 141. The transmitter 140 may transmit the modulated data to the user equipment (UE) 104 using one or more antenna ports, which may be realized by the one or more physical antennas 110a-n.

When carrier aggregation is configured, a user equipment (UE) 104 may have only one radio resource control (RRC) connection with the network. At the radio resource control (RRC) connection establishment/re-establishment/handover, one serving cell 107 (i.e., the primary cell (PCell) 107a) provides the non-access stratum (NAS) mobility information (e.g., Tracking Area Identity (TAI)) and the security input.

In the downlink, the component carrier (CC) 108 corresponding to the primary cell (PCell) 107a is the downlink primary component carrier (DL PCC) 108a. In the uplink, the component carrier (CC) 106 corresponding to the primary cell (PCell) 107a is the uplink primary component carrier (UL PCC) 106a. Depending on the capabilities of the user equipment (UE) 104, one or more secondary component carriers (SCC) 106b, 108b or secondary cells (SCell) 107b may be configured to form a set of serving cells with the primary cell (PCell) 107a. In the downlink, the component carrier (CC) 108 corresponding to the secondary cell (SCell) 107b is the downlink secondary component carrier (DL SCC) 108b. In the uplink, the component carrier (CC) 106 corresponding to the secondary cell (SCell) 107b is the uplink secondary component carrier (UL SCC) 106b. The number of downlink component carriers (CCs) 108 may be different from the number of uplink component carriers (CCs) 106 because multiple cells may share one uplink component carrier (CC) 106.

If carrier aggregation is configured, a user equipment (UE) 104 may have multiple serving cells: a primary cell (PCell) 107a and one or more secondary cells (SCell) 107b. From a network perspective, a serving cell 107 may be used as the primary cell (PCell) 107a by one user equipment (UE) 104 and used as a secondary cell (SCell) 107b by another user equipment (UE) 104. If carrier aggregation is not configured, a primary cell (PCell) 107a operates a single serving cell. There may be one or more secondary cells (SCell) 107b in addition to the primary cell (PCell) 107a if carrier aggregation is configured. One benefit of using carrier aggregation is that additional downlink and/or uplink data may be transmitted. As a result of the additional downlink data, additional uplink control information (UCI) 120 may be needed.

A number of spatial channels may be available on each serving cell 107 by using multiple antenna ports at a transmitter and a receiver. Therefore, multiple codewords (up to two codewords) may be transmitted simultaneously.

A channel state information (CSI) report may be generated for each component carrier (CC) 106, 108 or cell 107. In Rel-10, channel state information (CSI) reporting for up to five downlink component carriers (CCs) 108 may be supported. A channel state information (CSI) report may be used to inform the eNB 102 to adjust the transmission rate (modulation scheme and coding rate) dynamically based on the existing channel conditions at the user equipment (UE) 104. For example, if a channel state information (CSI) report indicates a good channel quality at the user equipment (UE) 104, the eNB 102 may select a higher order modulation and coding rate, thereby achieving a higher transmission rate for the downlink transmission of data on the physical downlink shared channel (PDSCH). If a channel state information (CSI) report indicates a poor channel quality at the user equipment (UE) 104, the eNB 102 may select a lower order modulation and coding rate, thereby achieving higher reliability for the transmission.

The channel state information (CSI) may include a channel quality indicator (COI), a precoding matrix indicator (PMI), a precoding type indicator (PTI) and/or rank indication (RI). A channel state information (CSI) report may be referred to as a rank indication (RI) report if the channel state information (CSI) report only includes rank indication (RI). A channel state information (CSI) report may be referred to as a channel quality indicator (CQI) report if the channel state information (CSI) report only includes a channel quality indicator (CQI). A channel state information (CSI) report may be referred to as a precoding matrix indicator (PMI) report if the channel state information (CSI) report only includes a precoding matrix indicator (PMI).

Figure 2:
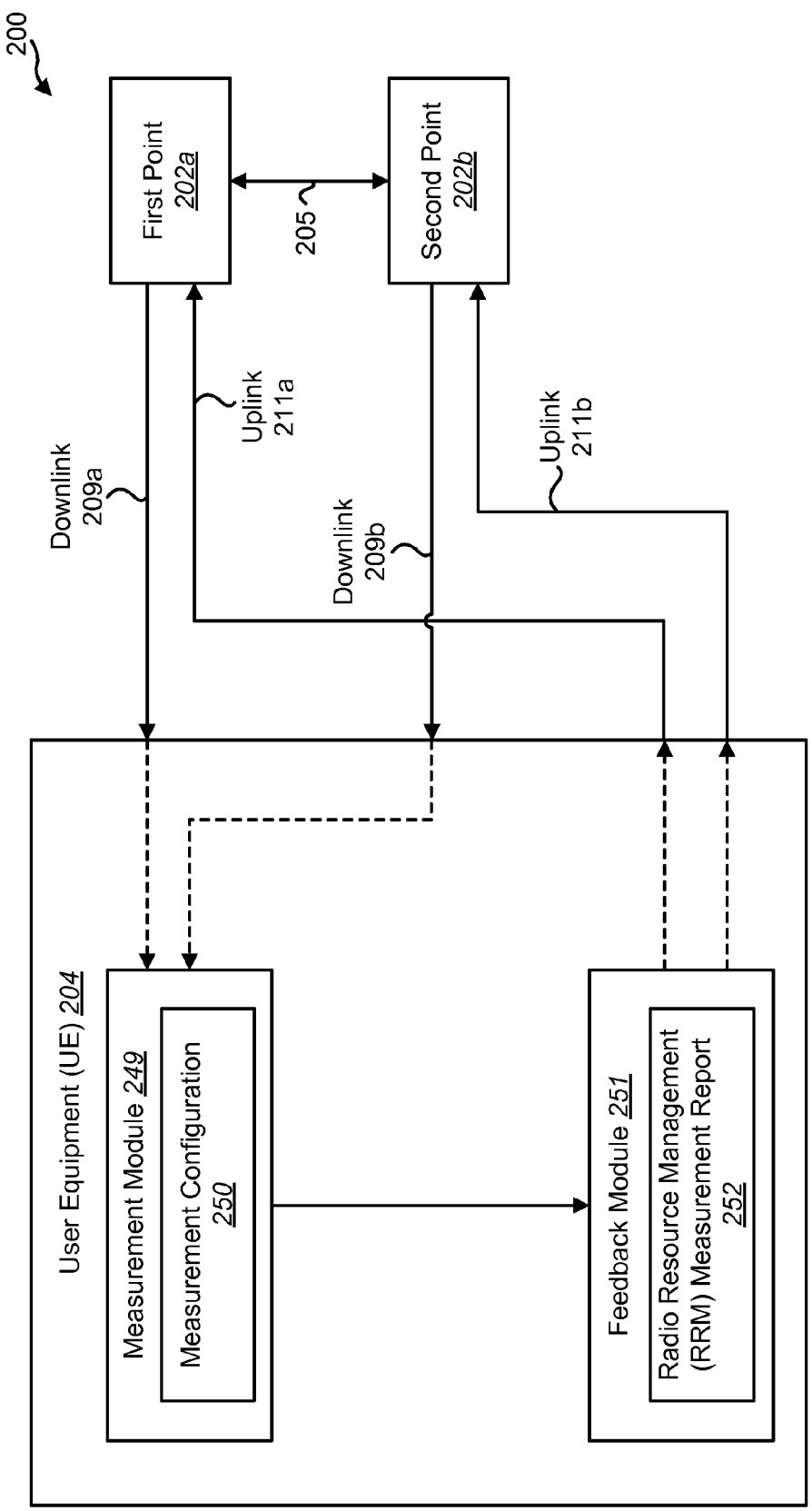
FIG. 2 is a block diagram illustrating a wireless communication system that may utilize coordinated multipoint (CoMP) transmission.

FIG. 2 is a block diagram illustrating a wireless communication system 200 that may utilize coordinated multipoint (CoMP) transmission. The wireless communication system 200 may include a first point 202a in communication with a user equipment (UE) 204 and a second point 202b in communication with the user equipment (UE) 204. Additional points (not shown) may also be in communication with the user equipment (UE) 204.

All points 202 communicating with a user equipment (UE) 204 may be referred to as transmission points 202. For simplicity, reference is also made herein to only a single transmission point 202, even though there may be multiple transmission points 202. There may be a communication link 205 between each of the points 202.

As used herein, a cooperating set refers to a set of geographically separated points 202 directly and/or indirectly participating in data transmission to a user equipment (UE) 204 in a time-frequency resource. The cooperating set may or may not be transparent to the user equipment (UE) 204. Thus, the set of transmission points 202 is a subset of the cooperating set.

A point 202 may be controlled by a base station. Communication between a user equipment (UE) 204 and a point 202 may be accomplished using transmissions over a wireless link, including an uplink 211a-b and a downlink 209a-b. The uplink 211 refers to communications sent from a user equipment (UE) 204 to one or more points 202 (referred to as reception points 202). The downlink 209 refers to communications sent from one or more points 202 (referred to as transmission points 202) to a user equipment (UE) 204. The set of reception points 202 may include none, some or all of the points 202 in the set of transmission points 202. Likewise, the set of transmission points 202 may include none, some or all of the points 202 in the set of reception points 202. A point 202 and a user equipment (UE) 204 may each operate as either a transmitter or a receiver in a MIMO system.

There has recently been a lot of interest in coordinated multipoint (CoMP) transmission schemes where multiple transmission points 202 cooperate. There has also been discussion on how to improve the feedback scheme for both coordinated multipoint (CoMP) transmission and multiuser MIMO schemes. The point 202 may make a decision concerning the use of coordinated multipoint (CoMP) transmission and the coordinated multipoint (CoMP) transmission method used based on feedback from the user equipment (UE) 204. Depending on the channel conditions observed by a user equipment (UE) 204, coordinated multipoint (CoMP) transmission operation and the coordinated multipoint (CoMP) transmission method of each cell may be configured dynamically and independently.

The user equipment (UE) 204 may include a measurement module 249. The measurement module 249 may include a measurement configuration 250. The measurement configuration 250 may define the settings for the user equipment (UE) 204 to generate and transmit a measurement report 252 to the network. The measurement report 252 may be generated by a feedback module 251 on the user equipment (UE) 204. The user equipment (UE) 204 may then transmit the measurement report to the E-UTRAN (e.g., the serving eNB 102, a neighbor eNB 102 and/or a network). More specifically, in Rel-11, coordinated multipoint (CoMP) radio resource management (RRM) measurement is introduced to achieve setting efficient coordinated multipoint (CoMP) transmission points and/or to choose an efficient channel state information (CSI) measurement set in the physical layer. In Rel-10, radio resource management (RRM) measurement can only support cell-specific reference signal (CRS) based reference signal received power (RSRP)/reference signal received quality (RSRQ) measurement.

For coordinated multipoint (CoMP) radio resource management (RRM) measurement, one or more channel state information reference signals (CSI-RSs) are needed to measure the channels of transmission points. The user equipment (UE) 204 does not need to know the linking between transmission points 202 and channel state information reference signals (CSI-RSs). From measurement reports of CSI-RSs, the E-UTRAN can know the conditions of transmission points 202, because the E-UTRAN knows the linking between transmission points 202 and channel state information reference signals (CSI-RSs). Coordinated multipoint (CoMP) radio resource management (RRM) measurement may generate a radio resource management (RRM) measurement report 252 that is then transmitted by the user equipment (UE) 204 to the network. Channel state information reference signal (CSI-RS) based radio resource management (RRM) measurement may be used for both coordinated multipoint (CoMP) radio resource management (RRM) measurement and other purposes (e.g., mobility, load sharing, radio resource management). Therefore, configurations for coordinated multipoint (CoMP) radio resource management (RRM) measurement may be considered as configurations for channel state information reference signal (CSI-RS) based radio resource management (RRM) measurement.

In Rel-10, radio resource management (RRM) measurement is defined primarily for inter-cell mobility management in the radio resource control (RRC) layer. The user equipment (UE) 204 may receive a measurement configuration 250 from the E-UTRAN (e.g., the serving eNB 102, a neighbor eNB 102 and/or a network). The E-UTRAN may provide the measurement configuration applicable for a user equipment (UE) 204 in RRC_CONNECTED by means of dedicated signaling (i.e., using the RRCConnectionReconfiguration message).

The measurement configuration 250 may instruct the user equipment (UE) 204 to obtain intra-frequency measurements (i.e., measurements at the downlink carrier frequencies of the serving cells 107), inter-frequency measurements (i.e., measurements at frequencies that differ from any of the downlink carrier frequencies of the serving cells 107) and inter-RAT measurements.

A measurement configuration 250 may include measurement objects, reporting configurations, measurement identities, quantity configurations and measurement gaps. Measurement objects refer to the objects on which the user equipment (UE) 204 performs measurements. For intra-frequency and inter-frequency measurements, a measurement object may be a single E-UTRA carrier frequency. Associated with this carrier frequency, the E-UTRAN may configure a list of cell specific offsets and a list of blacklisted cells. Blacklisted calls are those cells that are not considered in event evaluation or measurement reporting.

Reporting configurations may include reporting criterion that triggers the user equipment (UE) 204 to send a measurement report 252. The reporting criterion may be either periodical or a single event description. Reporting configurations may also include the reporting format. The reporting format may define the quantities that the user equipment (UE) 204 includes in a measurement report 252 and the associated information (e.g., the number of cells to report).

Measurement identities may link one measurement object with one reporting configuration. By configuring multiple measurement identities, it is possible to link more than one measurement object to the same reporting configuration. It is also possible to link more than one reporting configuration to the same measurement object. The measurement identity may be used as a reference number in the measurement report 252.

One quantity configuration may be configured per radio access technology (RAT) type. The quantity configuration may define the measurement quantities and the associated filtering used for all event evaluations and related reporting of that measurement type. One filter may be configured per measurement quantity. Measurement gaps may refer to periods that the user equipment (UE) 204 may use to perform measurements (i.e., no uplink 211 or downlink 209 transmissions are scheduled during the measurement gap).

The E-UTRAN may only configure a single measurement object for a given frequency. In other words, it is not possible to configure two or more measurement objects for the same frequency with different associated parameters (e.g., different offsets and/or blacklists). The E-UTRAN may configure multiple instances of the same event (e.g., by configuring two reporting configurations with different thresholds).

The user equipment (UE) 204 may maintain a single measurement configuration 250. The measurement configuration 250 may include a single measurement object list, a single reporting configuration list and a single measurement identities list. The measurement object list may include measurement objects that are specified per radio access technology (RAT) type. The measurement objects may include intra-frequency objects (i.e., objects corresponding to the serving frequencies), inter-frequency objects and inter-RAT objects. Similarly, the reporting configuration list may include E-UTRA and inter-RAT reporting configurations. Some reporting configurations may not be linked to a measurement object. Likewise, some measurement objects may not be linked to a reporting configuration.

The measurement procedures in a measurement configuration 250 may distinguish between the serving cell(s) 107 (the PCell 107*a* and one or more SCells 107*b* if configured for a user equipment (UE) 204 that supports carrier aggregation), the listed cells (the cells listed within the measurement objects) and detected cells (the cells that are not listed within the measurement objects but are detected by the user equipment (UE) 204 on the carrier frequencies indicated by the measurement objects). For E-UTRA, the user equipment (UE) 204 may measure and report on the serving cells 107, the listed cells and the detected cells.

It may be required that the user equipment (UE) 204 be able to identify new intra-frequency cells and perform reference signal received power (RSRP) measurements of identified intra-frequency cells without an explicit intra-frequency neighbor cell list that includes the physical layer cell identities. During the RRC_CONNECTED state, the user equipment (UE) 204 may continuously measure identified intra-frequency cells and search for and identify new intra-frequency cells. It may also be required that the user equipment (UE) 204 be able to identify new inter-frequency cells. The user equipment (UE) 204 may perform reference signal received power (RSRP) measurements of identified inter-frequency cells if carrier frequency information is provided by the PCell 107*a*, even if no explicit neighbor list with physical layer cell identities is provided.

For all measurements performed by the measurement module 249, the user equipment (UE) 204 may apply layer 3 filtering before using the measured results for evaluation of reporting criteria and/or for measurement reporting. Whenever the user equipment (UE) 204 has a measurement configuration 250, the user equipment (UE) 204 may perform reference signal received power (RSRP) measurements and reference signal received quality (RSRQ) measurements for each serving cell 107.

The user equipment (UE) 204 may perform measurements on the frequencies and radio access technologies (RATs) indicated in the measurement configuration 250 if a measurement gap configuration is setup or if the user equipment (UE) 204 does not require measurement gaps to perform the specific measurement. The user equipment (UE) 204 may also perform measurements on the frequencies and radio access technologies (RATs) indicated in the measurement configuration 250 if s-Measure is not configured or if s-Measure is configured and the PCell 107*a* reference signal received power (RSRP) after layer 3 filtering is lower than the value of s-Measure.

As discussed above, in Rel-10 radio resource management (RRM) measurement, reference signal received power (RSRP) and reference signal received quality (RSRQ) are measured for the cell-specific reference signal (CRS) but not for the channel state information reference signal (CSI-RS). In Rel-11 radio resource management (RRM) measurement, reference signal received power (RSRP) and/or reference signal received quality (RSRQ) are measured for both the cell-specific reference signal (CRS) and the channel state information reference signal (CSI-RS).

For the measurement ID (measId) for which the measurement reporting procedure was triggered, the user equipment (UE) 204 may set the measurement results (measResults) within the MeasurementReport message and submit the MeasurementReport message to lower layers for transmission from the user equipment (UE) 204 to the E-UTRAN.

The RRCConnectionReconfiguration message is the command to modify an RRC connection. The RRCConnectionReconfiguration message may convey information for measurement configuration 250, mobility control, radio resource configuration (including resource blocks (RBs), the medium access control (MAC) main configuration and the physical channel configuration), any associated dedicated NAS information and security configuration. RRCConnectionReconfiguration is given below:

```
RRCConnectionReconfiguration-r8-IEs ::= SEQUENCE {
    measConfig                MeasConfig              OPTIONAL, -
- Need ON
    mobilityControlInfo       MobilityControlInfo     OPTIONAL, -
- Cond HO
    dedicatedInfoNASList      SEQUENCE (SIZE(1..maxDRB)) OF
                              DedicatedInfoNAS        OPTIONAL, --
Cond nonHO
    radioResourceConfigDedicated   RadioResourceConfigDedicatedOPTIONAL, --
Cond HO-toEUTRA
    securityConfigHO          SecurityConfigHO        OPTIONAL, --
Cond HO
    nonCriticalExtension      RRCConnectionReconfiguration-v890-IEs
    OPTIONAL
}.
```

The information element (IE) MeasConfig may specify measurements to be performed by the user equipment (UE) 204. The information element (IE) MeasConfig may also cover intra-frequency, inter-frequency and inter-RAT mobility as well as the configuration of measurement gaps. The information element (IE) MeasConfig is given below:

```
-- ASN1START
MeasConfig ::=                SEQUENCE {
    -- Measurement objects
    measObjectToRemoveList            MeasObjectToRemoveList
    OPTIONAL,  -- Need ON
    measObjectToAddModList            MeasObjectToAddModList
    OPTIONAL,  -- Need ON
    -- Reporting configurations
    reportConfigToRemoveList          ReportConfigToRemoveList        OPTIONAL,
    -- Need ON
    reportConfigToAddModList          ReportConfigToAddModList        OPTIONAL,
    -- Need ON
    -- Measurement identities
    measIdToRemoveList                MeasIdToRemoveList
    OPTIONAL,  -- Need ON
    measIdToAddModList                MeasIdToAddModList
    OPTIONAL,  -- Need ON
    -- Other parameters
    quantityConfig                    QuantityConfig                  OPTIONAL, -
- Need ON
    measGapConfig                     MeasGapConfig                   OPTIONAL,
    -- Need ON
    s-Measure                         RSRP-Range                      OPTIONAL, -
- Need ON
    preRegistrationInfoHRPD           PreRegistrationInfoHRPD
    OPTIONAL,  -- Need OP
    speedStatePars         CHOICE {
        release                       NULL,
        setup                         SEQUENCE {
            mobilityStateParameters           MobilityStateParameters,
            timeToTrigger-SF                  SpeedStateScaleFactors
        }
    }                                                                 OPTIONAL, --
Need ON
    ...
}
MeasIdToRemoveList ::=        SEQUENCE (SIZE (1..maxMeasId)) OF MeasId
MeasObjectToRemoveList ::=          SEQUENCE (SIZE (1..maxObjectId)) OF
MeasObjectId
ReportConfigToRemoveList ::=        SEQUENCE (SIZE (1..maxReportConfigId)) OF
ReportConfigId
-- ASN1STOP.
```

The information element (IE) MeasId may be used to identify a measurement configuration 250 (i.e., the linking of a measurement object and a reporting configuration).

The information element (IE) MeasIdToAddModList concerns a list of measurement identities to add to or modify the measurement configuration 250. For each entry in MeasIdToAddModList, the measID, the associated measObjectId and the associated reportConfigId are included. The information element (IE) MeasIdToAddModList is given below:

```
-- ASN1START
MeasIdToAddModList ::=      SEQUENCE (SIZE (1..maxMeasId)) OF
MeasIdToAddMod
MeasIdToAddMod ::=SEQUENCE {
    measId              MeasId,
    measObjectId        MeasObjectId,
    reportConfigId      ReportConfigId
}
-- ASN1STOP.
```

The information element (IE) MeasObjectToAddModList concerns a list of measurement objects to add or modify. The information element (IE) MeasObjectToAddModList may link measObjectId and measObject. The information element (IE) MeasObjectToAddModList is given below:

```
-- ASN1START
MeasObjectToAddModList ::=          SEQUENCE (SIZE
                                    (1..maxObjectId)) OF
MeasObjectToAddMod
MeasObjectToAddMod ::=   SEQUENCE {
    measObjectId             MeasObjectId,
    measObject               CHOICE {
        measObjectEUTRA          MeasObjectEUTRA,
        measObjectUTRA           MeasObjectUTRA,
        measObjectGERAN          MeasObjectGERAN,
        measObjectCDMA2000       MeasObjectCDMA2000,
        ...
    }
}
-- ASN1STOP.
```

The information element (IE) MeasObjectEUTRA specifies information applicable for intra-frequency or intra-frequency E-UTRA cells. The information element (IE) MeasObjectEUTRA is given below:

```
-- ASN1START
MeasObjectEUTRA ::=              SEQUENCE {
    carrierFreq                      ARFCN-ValueEUTRA,
    allowedMeasBandwidth             AllowedMeasBandwidth,
    presenceAntennaPort1             PresenceAntennaPort1,
    neighCellConfig                  NeighCellConfig,
    offsetFreq                       Q-OffsetRange               DEFAULT dB0,
    -- Cell list
    cellsToRemoveList                CellIndexList               OPTIONAL, -- Need ON
    cellsToAddModList                CellsToAddModList           OPTIONAL, -- Need ON
    -- Black list
    blackCellsToRemoveList           CellIndexList               OPTIONAL, -- Need ON
    blackCellsToAddModList           BlackCellsToAddModList      OPTIONAL, -- Need ON
    cellForWhichToReportCGI          PhysCellId                  OPTIONAL, -- Need ON
    ...,
    [[measCycleSCell-r10             MeasCycleSCell-r10          OPTIONAL, -- Need ON
        measSubframePatternConfigNeigh-r10 MeasSubframePatternConfigNeigh-r10
        OPTIONAL                         -- Need ON
    ]]
}
CellsToAddModList ::=            SEQUENCE (SIZE (1..maxCellMeas)) OF
CellsToAddMod
CellsToAddMod ::=   SEQUENCE {
    cellIndex                        INTEGER (1..maxCellMeas),
    physCellId                       PhysCellId,
    cellIndividualOffset             Q-OffsetRange
}
BlackCellsToAddModList ::=       SEQUENCE (SIZE (1..maxCellMeas)) OF
BlackCellsToAddMod
BlackCellsToAddMod ::= SEQUENCE {
    cellIndex                        INTEGER (1..maxCellMeas),
    physCellIdRange                  PhysCellIdRange
}
MeasCycleSCell-r10 ::=           ENUMERATED {sf160, sf256, sf320, sf512,
                                    sf640, sf1024, sf1280, spare1}
MeasSubframePatternConfigNeigh-r10 ::= CHOICE {
    release                          NULL,
    setup                            SEQUENCE {
        measSubframePatternNeigh-r10     MeasSubframePattern-r10,
        measSubframeCellList-r10         MeasSubframeCellList-r10   OPTIONAL
        -- Cond measSubframe
    }
}
```

```
MeasSubframeCellList-r10 ::=   SEQUENCE (SIZE (1..maxCellMeas)) OF
PhysCellIdRange
-- ASN1STOP.
```

The information element (IE) ReportConfigEUTRA specifies criteria for triggering an E-UTRA measurement reporting event. The trigger type may be set to event trigger or periodic trigger. The E-UTRA measurement reporting events are listed below:

Event A1: Serving becomes better than absolute threshold;
Event A2: Serving becomes worse than absolute threshold;
Event A3: Neighbour becomes amount of offset better than PCell;
Event A4: Neighbour becomes better than absolute threshold;
Event A5: PCell becomes worse than absolute threshold1 AND Neighbour becomes better than another absolute threshold2;
Event A6: Neighbour becomes amount of offset better than SCell.

The information element (IE) ReportConfigEUTRA is given below:

```
-- ASN1START
ReportConfigEUTRA ::=                    SEQUENCE {
    triggerType                              CHOICE {
        event                                    SEQUENCE {
            eventId                                  CHOICE {
                eventA1                                  SEQUENCE {
                    a1-Threshold                             ThresholdEUTRA
                },
                eventA2                                  SEQUENCE {
                    a2-Threshold                             ThresholdEUTRA
                },
                eventA3                                  SEQUENCE {
                    a3-Offset                                INTEGER (-30..30),
                    reportOnLeave                            BOOLEAN
                },
                eventA4                                  SEQUENCE {
                    a4-Threshold                             ThresholdEUTRA
                },
                eventA5                                  SEQUENCE {
                    a5-Threshold1                            ThresholdEUTRA,
                    a5-Threshold2                            ThresholdEUTRA
                },
                ...,
                eventA6-r10                              SEQUENCE {
                    a6-Offset-r10                            INTEGER (-30..30),
                    a6-ReportOnLeave-r10                     BOOLEAN
                }
            },
            hysteresis                               Hysteresis,
            timeToTrigger                            TimeToTrigger
        },
        periodical                               SEQUENCE {
            purpose                                  ENUMERATED {
                                                         reportStrongestCells, reportCGI}
        }
    },
    triggerQuantity                          ENUMERATED {rsrp, rsrq},
    reportQuantity                           ENUMERATED {sameAsTriggerQuantity, both},
    maxReportCells                           INTEGER (1..maxCellReport),
    reportInterval                           ReportInterval,
    reportAmount                             ENUMERATED {r1, r2, r4, r8, r16, r32, r64, infinity},
    ...,
    [[    si-RequestForHO-r9                      ENUMERATED {setup}         OPTIONAL, -
- Cond reportCGI
        ue-RxTxTimeDiffPeriodical-r9             ENUMERATED {setup}         OPTIONAL  -
- Need OR
    ]],
    [[    includeLocationInfo-r10                  ENUMERATED {true}          OPTIONAL, -
- Cond reportMDT
        reportAddNeighMeas-r10                       ENUMERATED {setup}         OPTIONAL
        -- Need OR
    ]]
}
ThresholdEUTRA ::=                       CHOICE{
    threshold-RSRP                           RSRP-Range,
    threshold-RSRQ                           RSRQ-Range
}
-- ASN1STOP.
```

The information element (IE) ReportConfigId may be used to identify a measurement reporting configuration. The information element (IE) MeasResults covers measured results for intra-frequency, inter-frequency and inter-RAT mobility. The information element (IE) MeasResults may include measId, the measurement results of PCell 107a and optionally the measurement results of the neighbor cell and the SCells 107b.

The user equipment (UE) 204 may include a variable VarMeasConfig. The variable VarMeasConfig is discussed in additional detail below in relation to FIG. 8. The variable VarMeasConfig may include the accumulated configuration of the measurements to be performed by the user equipment (UE) 204, including intra-frequency, inter-frequency and inter-RAT mobility related measurements. The VarMeasConfig variable is given below:

The channel state information (CSI) related radio resource control (RRC) configuration may be defined for the purpose of channel quality and/or channel state measurements. The user equipment (UE) 204 may report the channel state information (CSI) in the physical layer. Depending on the reporting mode, either the cell-specific reference signal (CRS) or the channel state information reference signal (CSI-RS) is used for the channel state information (CSI) measurement. The E-UTRAN may provide the CQI report configuration (CQI-ReportConfig) and the CSI-RS configuration (CSI-RS-Config) applicable for a user equipment (UE) 204 in RRC_CONNECTED using dedicated signaling (i.e., using the radioResourceConfigDedicated in the RRCConnectionReconfiguration message).

```
-- ASN1START
VarMeasConfig ::=                   SEQUENCE {
    -- Measurement identities
    measIdList                      MeasIdToAddModList              OPTIONAL,
    -- Measurement objects
    measObjectList                  MeasObjectToAddModList          OPTIONAL,
    -- Reporting configurations
    reportConfigList                ReportConfigToAddModList        OPTIONAL,
    -- Other parameters
    quantityConfig                  QuantityConfig                  OPTIONAL,
    s-Measure                       INTEGER (-140..-44)             OPTIONAL,
    speedStatePars                  CHOICE {
        release                         NULL,
        setup                           SEQUENCE {
            mobilityStateParameters         MobilityStateParameters,
            timeToTrigger-SF                SpeedStateScaleFactors
        }
    }                                                               OPTIONAL
}
-- ASN1STOP.
```

The user equipment (UE) 204 may also include a variable VarMeasReportList. The variable VarMeasReportList is discussed in additional detail below in relation to FIG. 9. The variable VarMeasReportList may include information about the measurements for which the triggering conditions have been met. The VarMeasReportList variable is given below:

The information element (IE) CSI-RS-Config may be used to specify the channel state information (CSI) reference signal configuration. The information element (IE) CSI-RS-Config may include configurations for the number of antenna ports for CSI-RS, the physical resource for CSI-RS, the subframes for CSI-RS, etc. The information element (IE) CQI-

```
-- ASN1START
VarMeasReportList ::=           SEQUENCE (SIZE (1..maxMeasId)) OF VarMeasReport
VarMeasReport ::=               SEQUENCE {
    -- List of measurement that have been triggered
    measId                          MeasId,
    cellsTriggeredList              CellsTriggeredList              OPTIONAL,
    numberOfReportsSent             INTEGER
}
CellsTriggeredList ::=          SEQUENCE (SIZE (1..maxCellMeas)) OF CHOICE {
    physCellIdEUTRA                     PhysCellId,
    physCellIdUTRA                      CHOICE {
        fdd                                 PhysCellIdUTRA-FDD,
        tdd                                 PhysCellIdUTRA-TDD
    },
    physCellIdGERAN                     SEQUENCE {
        carrierFreq                         CarrierFreqGERAN,
        physCellId                          PhysCellIdGERAN
    },
    physCellIdCDMA2000                  PhysCellIdCDMA2000
}
-- ASN1STOP.
```

ReportConfig may be used to specify the CQI reporting configuration of a user equipment (UE) 204.

Once the user equipment (UE) 204 has generated a measurement report 252, the user equipment (UE) 204 may use the feedback module 251 to transmit the measurement report 252 to the E-UTRAN.

Figure 3:
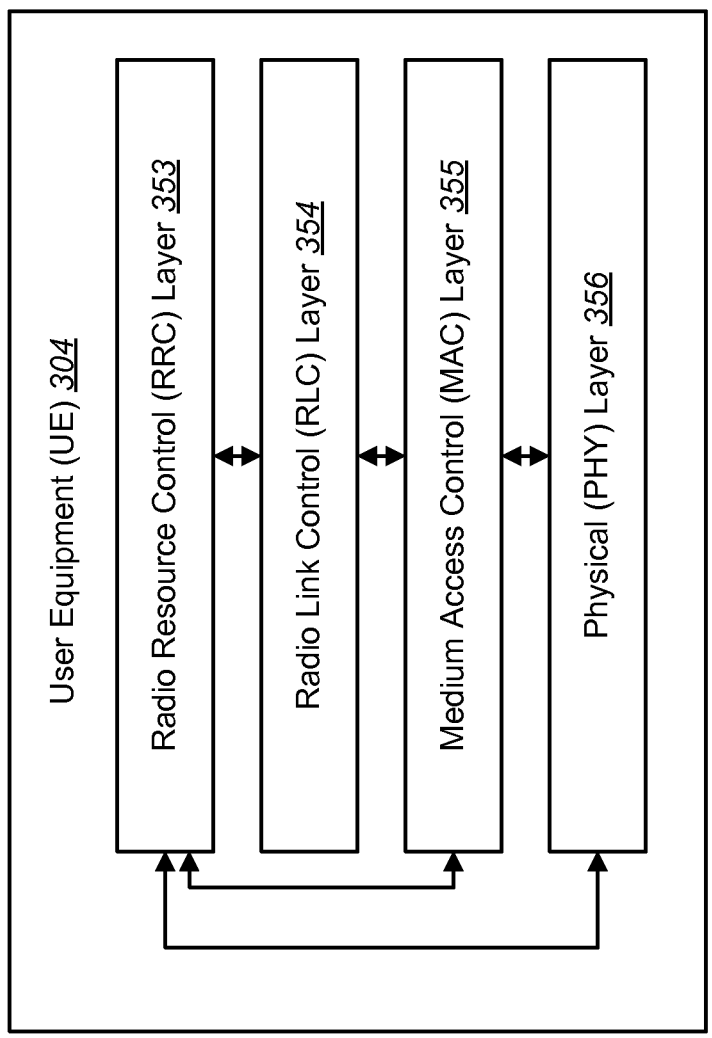
FIG. 3 is a block diagram illustrating the layers used by a user equipment (UE)

FIG. 3 is a block diagram illustrating the layers used by a user equipment (UE) 304. The user equipment (UE) 304 of FIG. 3 may be one configuration of the user equipment (UE) 104 of FIG. 1. The user equipment (UE) 304 may include a radio resource control (RRC) layer 353, a radio link control (RLC) layer 354, a medium access control (MAC) layer 355 and a physical (PHY) layer 356. From the physical (PHY) layer 356, each of the radio resource control (RRC) layer 353, the radio link control (RLC) layer 354 and the medium access control (MAC) layer 355 may be referred to as higher layers 114. The user equipment (UE) 304 may include additional layers not shown in FIG. 3.

Figure 4:
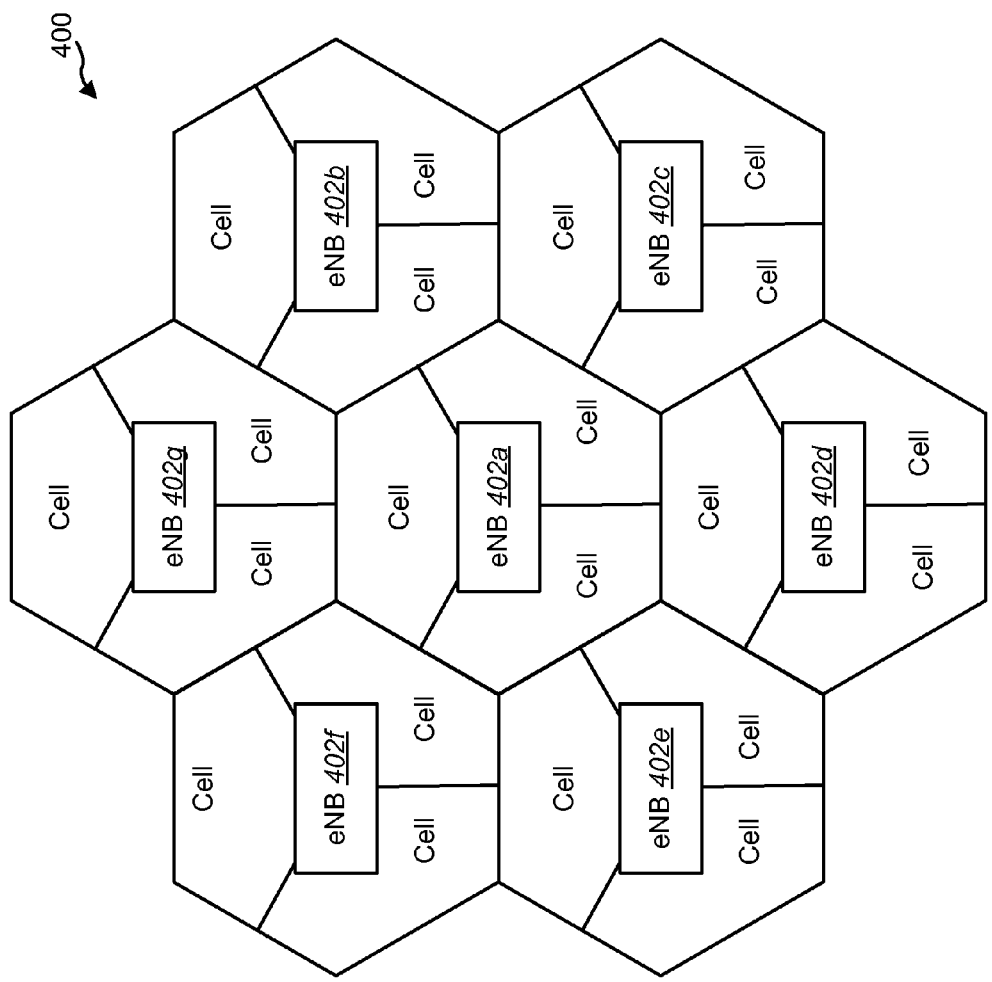
FIG. 4 is a block diagram illustrating a homogenous network with intra-site coordinated multipoint (CoMP)

FIG. 4 is a block diagram illustrating a homogenous network 400 with intra-site coordinated multipoint (CoMP). Each eNB 402a-g may operate three cells. Each eNB 402a-g may transmit downlink signals for the three cells. The coordination area for this homogenous network 400 is three cells for each eNB 402.

Figure 5:
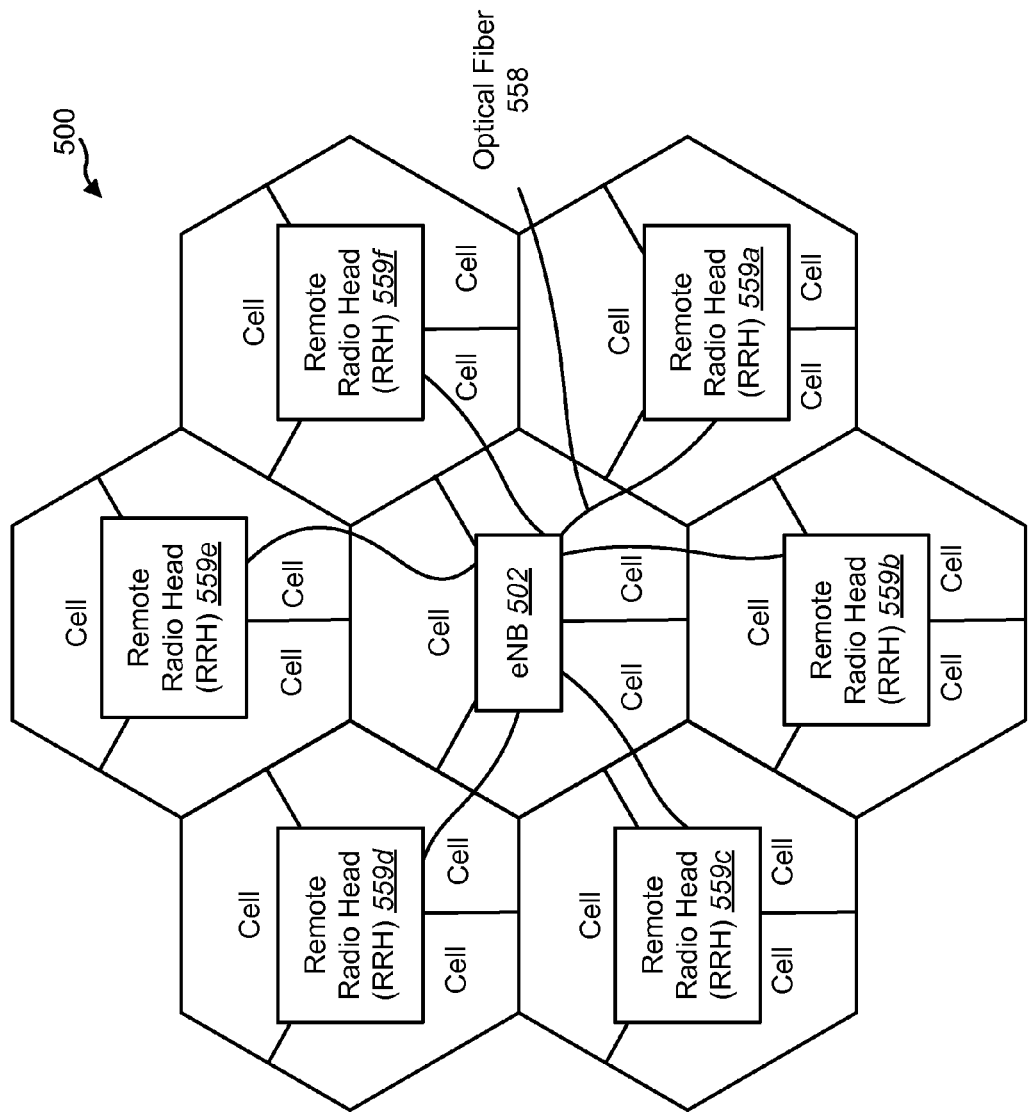
FIG. 5 is a block diagram illustrating a homogenous network with high Tx power remote radio heads (RRHs)

FIG. 5 is a block diagram illustrating a homogenous network 500 with high Tx power remote radio heads (RRHs) 559a-f. Each remote radio head (RRH) 559 and an eNB 502 may also be referred to as a point. The eNB 502 may operate 21 cells using six remote radio heads (RRHs) 559. Each remote radio head (RRH) 559 and the eNB 502 may transmit downlink signals for the three cells associated with the remote radio head (RRH) 559. Each remote radio head (RRH) 559 may be coupled to the eNB 502 via an optical fiber 558. The coordination area for this homogenous network 500 is 21 cells.

Figure 6:
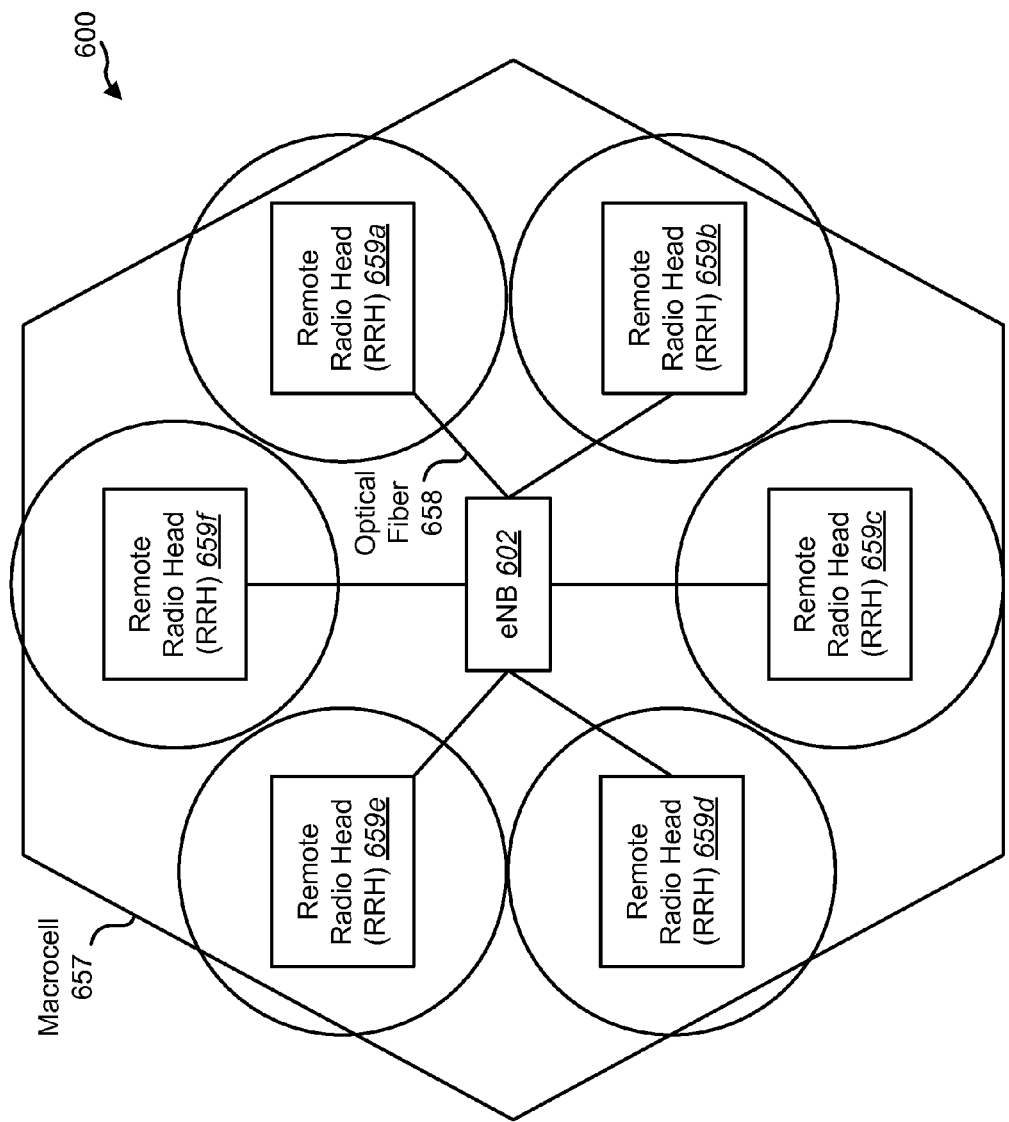
FIG. 6 is a block diagram illustrating a network with low Tx power remote radio heads (RRHs) within the macrocell coverage.

FIG. 6 is a block diagram illustrating a network 600 with low Tx power remote radio heads (RRHs) 659a-f within the macrocell 657 coverage. Each remote radio head (RRH) 659 and an eNB 602 may also be referred to as a point. The macrocell 657 may include an eNB 602 coupled to multiple low Tx power remote radio heads (RRHs) 659 (also referred to as Omni-antennas) via optical fibers 658. The eNB 602 operates one macrocell 657 and six areas using the six remote radio heads (RRHs) 659. The coordination area for this heterogeneous network is one macrocell 657 and six areas.

The transmission/reception points created by the remote radio heads (RRHs) 659 may have the same cell ID as the macrocell 657 or different cell IDs from the macrocell 657. When the transmission/reception points created by the remote radio head (RRH) 659 have the same cell IDs as the macrocell 657, it is commonly understood that all the transmission points transmit the same cell-specific reference signal (CRS) but can transmit different channel state information reference signals (CSI-RSs).

Figure 7:
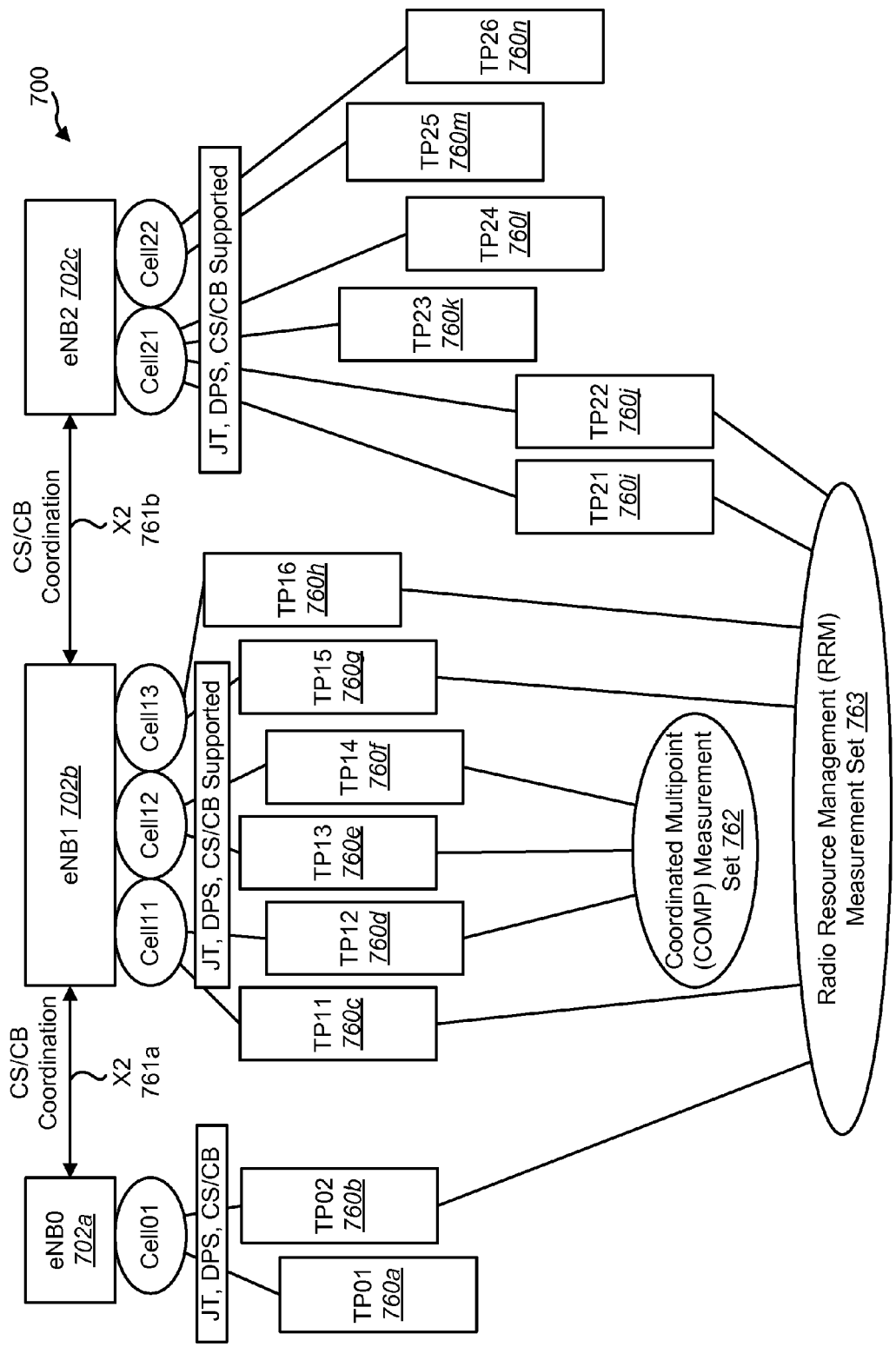
FIG. 7 is a block diagram illustrating a generalized coordinated multipoint (CoMP) architecture.

FIG. 7 is a block diagram illustrating a generalized coordinated multipoint (CoMP) architecture 700. Multiple coordinated multipoint (CoMP) measurement sets 762 may be used for user equipment (UE) 104. For example, a coordinated multipoint (CoMP) cooperating set may be a set of geographically separated points directly and/or indirectly participating in data transmission to a user equipment (UE) 104 in a time-frequency resource. The coordinated multipoint (CoMP) cooperating set may or may not be transparent to the user equipment (UE) 104.

The coordinated multipoint (CoMP) transmission points 760a-n may be a point or set of points transmitting data to a user equipment (UE) 104. The coordinated multipoint (CoMP) transmission points 760 are a subset of the coordinated multipoint (CoMP) cooperating set. A coordinated multipoint (CoMP) measurement set 762 may be the set of points about which channel state/statistical information related to their link to the user equipment (UE) 104 is measured and/or reported at L1 (PUCCH). A radio resource management (RRM) measurement set 763 may be the set of cells for which radio resource management (RRM) measurements are performed. The radio resource management (RRM) measurement set 763 is already defined in Rel-8. Additional radio resource management (RRM) measurement methods (such as coordinated multipoint (CoMP) radio resource management (RRM) measurement) may be considered (e.g., in order to separate different points belonging to the same logical cell entity or in order to select the coordinated multipoint (CoMP) measurement set 762). The additional radio resource management (RRM) measurement set 763 may be referred to as the coordinated multipoint (CoMP) radio resource management (RRM) measurement set 763.

In the generalized coordinated multipoint (CoMP) architecture 700, fast coordination coordinated multipoint (CoMP) schemes (e.g., JT, DPS, CS/CB) may be used only for intra-eNB communications while slower coordination coordinated multipoint (CoMP) schemes (e.g., CS/CB) may be used for inter-eNB communications. In Rel-11, only control information may be transmitted over X2 761 a-b; no data may be transported over X2 761. Proprietary inter-eNB interfaces may be used to provide faster schemes for inter-eNB communication (especially in cases of co-located eNBs 702a-c). Since the user equipment (UE) 104 only knows cells (and not eNBs 702), this has no impact on the user equipment (UE) 104.

While the network may be aware of all the coordinated multipoint (CoMP) measurement sets 762, the user equipment (UE) 104 may only know of two coordinated multipoint (CoMP) measurement sets 762: the coordinated multipoint (CoMP) measurement set 762 and the radio resource management (RRM) measurement set 763.

The coordinated multipoint (CoMP) measurement may be based on a channel state information reference signal (CSI-RS) measurement. This is because a CRS-based radio resource management (RRM) measurement will not work when the transmission/reception points created by remote radio heads (RRHs) 659 have the same cell ID as the macrocell 657 (as illustrated above in relation to FIG. 6), the transmission points 760 are not distinguishable to the user equipment (UE) 104 using the cell-specific reference signal (CRS). Using the channel state information reference signal (CSI-RS), the reference signal received power (RSRP) and reference signal received quality (RSRQ) may still be measured (referred to as the CSI-RSRP and the CSI-RSRQ). The CSI-RSRP and the CSI-RSRQ may be used by the network to determine which transmission points 760 should be included in the coordinated multipoint (CoMP) measurement set 762 (e.g., addition, removal, replacement). Inter-cell handover may not be one of the purposes of the coordinated multipoint (CoMP) radio resource management (RRM) measurement.

The measurement of the CSI-RSRP and the CSI-RSRQ needs to be defined. Currently, the channel state information reference signal (CSI-RS) is used for channel state information (CSI) measurement but not for coordinated multipoint (CoMP) radio resource management (RRM) measurement. The CSI-RSRP and the CSI-RSRQ measurements may also be used for mobility purposes.

Figure 8:
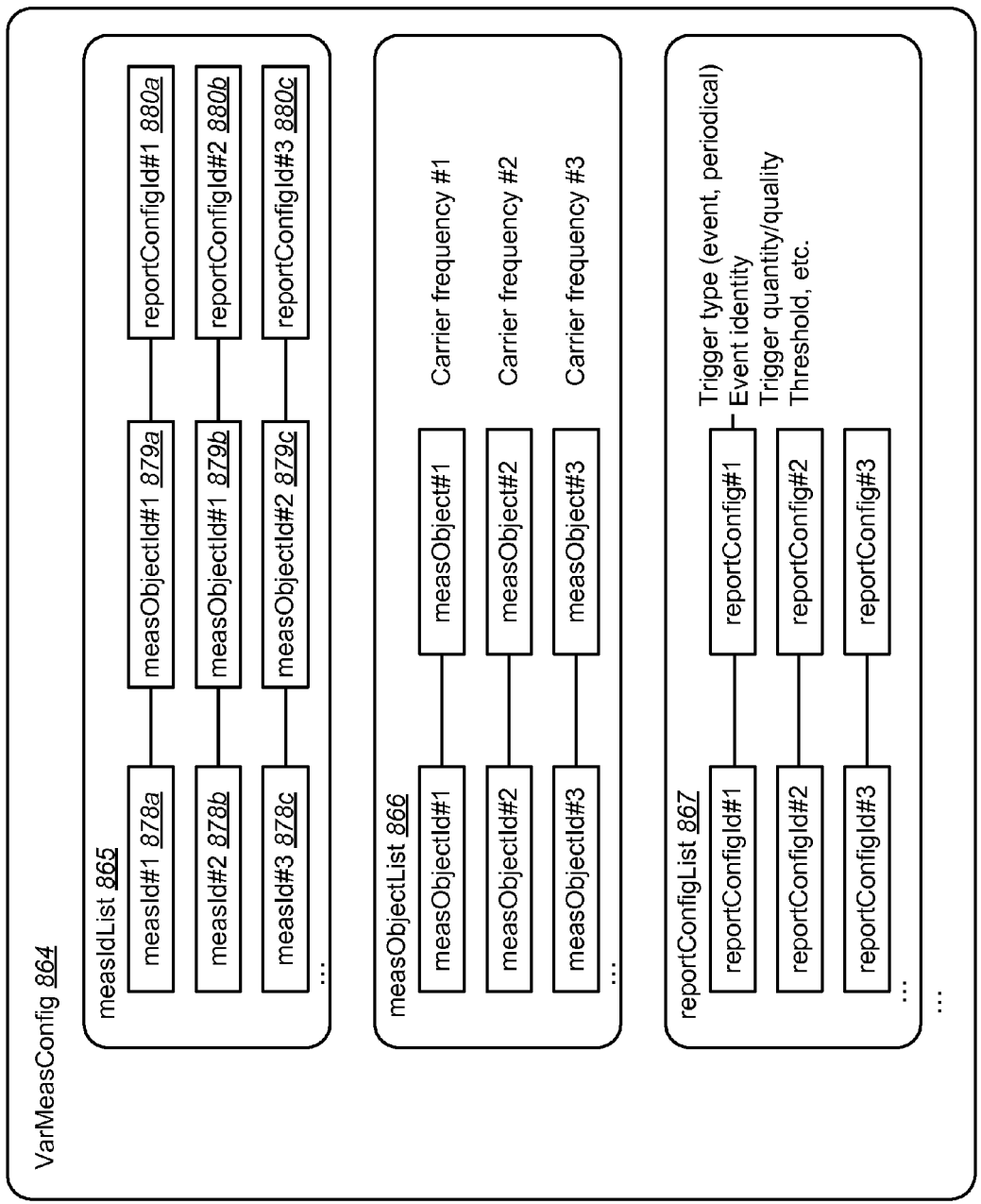
FIG. 8 is a block diagram illustrating the structure of a measurement configuration variable.

FIG. 8 is a block diagram illustrating the structure of a measurement configuration variable 864. The measurement configuration variable 864 may be referred to as VarMeasConfig. Both the user equipment (UE) 104 and the eNB 102 may maintain the measurement configuration variable 864. The measurement configuration variable 864 may include a list of measurement IDs 865a-c, a list of measurement objects 866 and a list of report configurations 867. The list of measurement IDs 865 may include one or more measurement IDs 878a-c, one or more measurement object IDs 879a-c and one or more report configuration IDs 880a-c. Each measurement ID 878 may be linked to a measurement object ID 879 and a report configuration ID 880.

Figure 9:
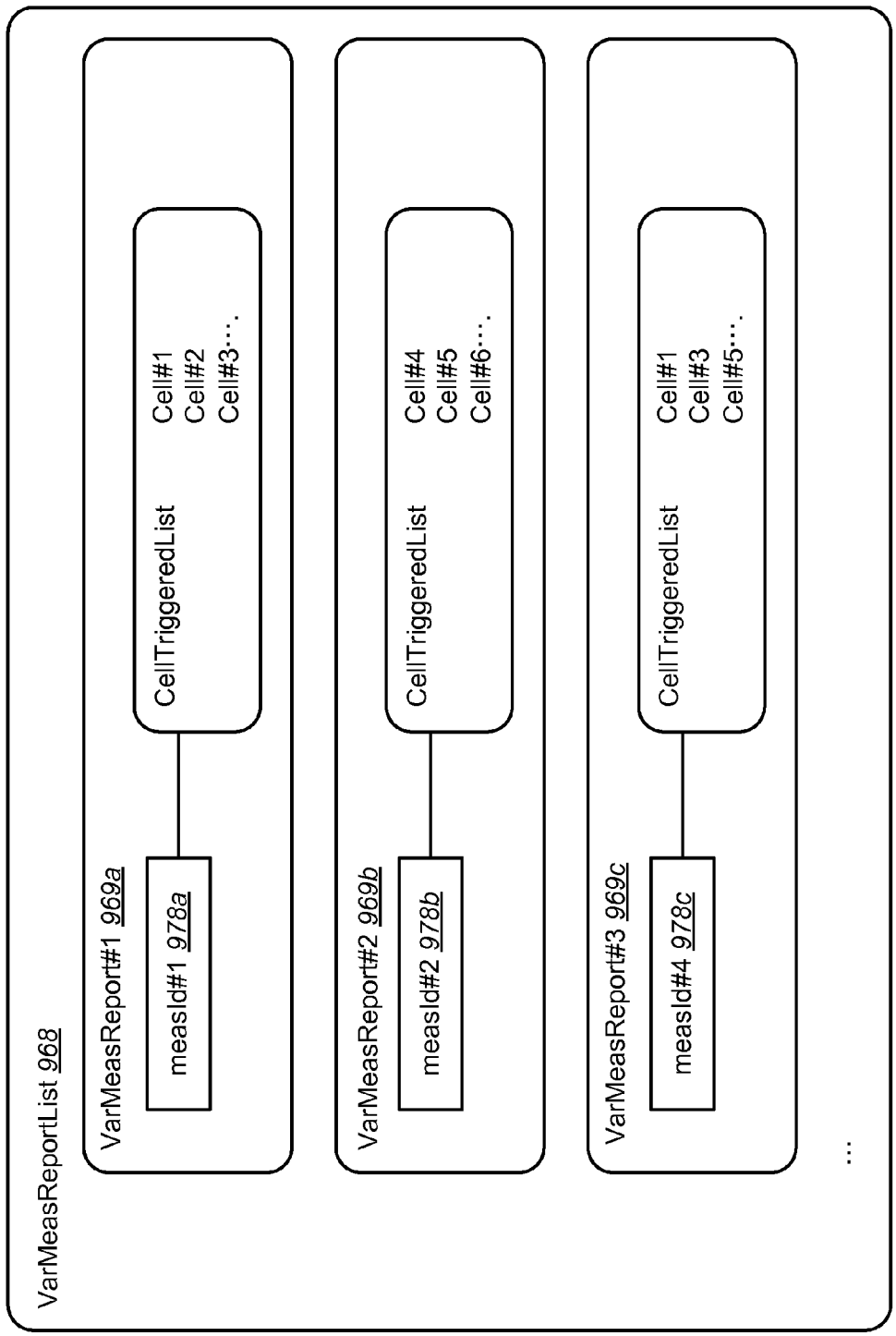
FIG. 9 is a block diagram illustrating the structure of a measurement report list.

FIG. 9 is a block diagram illustrating the structure of a measurement report list 968. The measurement report list 968 may be referred to as VarMeasReportList. Both the user equipment (UE) 104 and the eNB 102 may maintain the measurement report list 968. The measurement report list 968 may include multiple measurement reports 969a-c. Each measurement report 969 may include the measurement ID 978a-c and the list of cells that triggered the measurement report 969.

Figure 10:
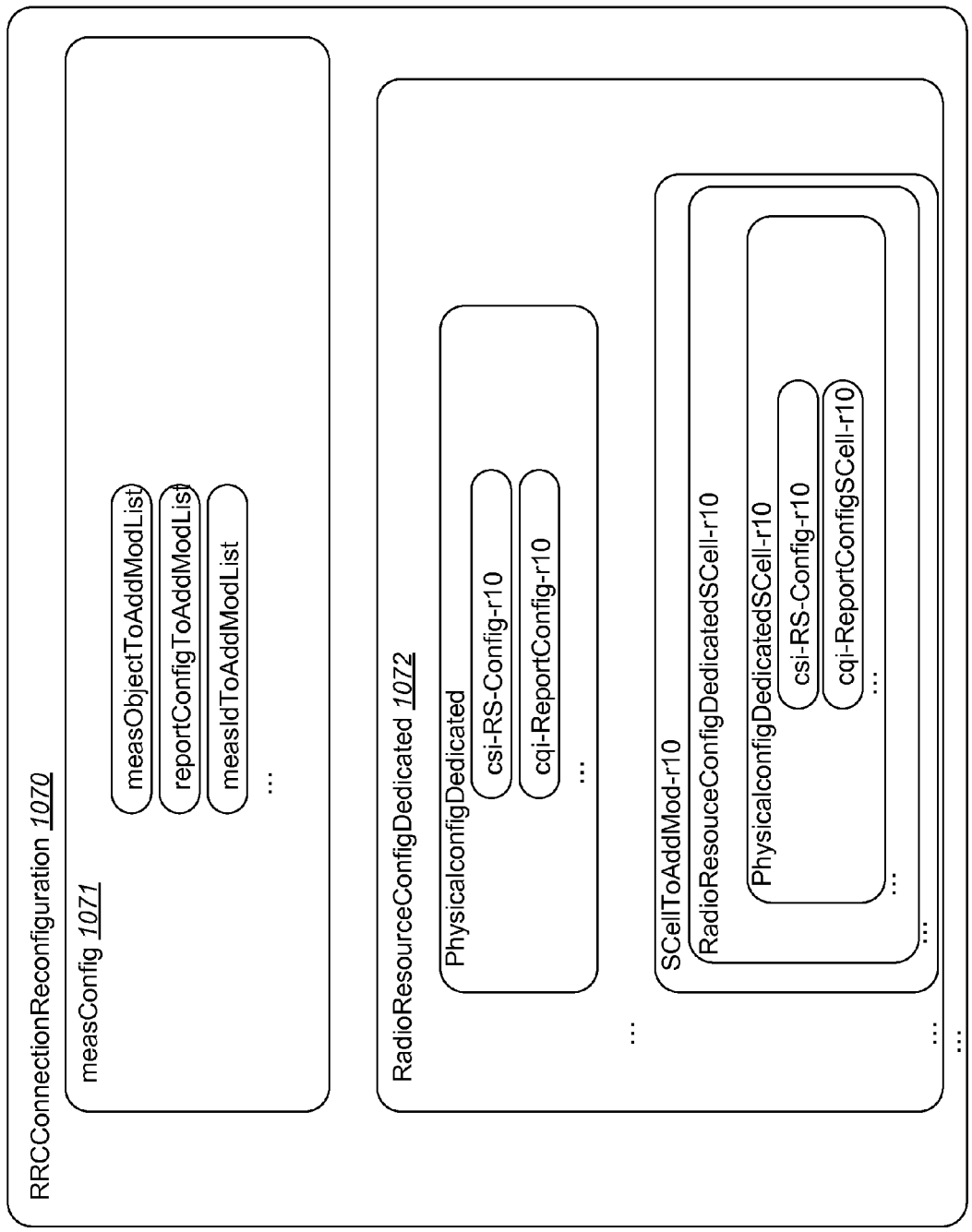
FIG. 10 is a block diagram illustrating an RRC Connection Reconfiguration message structure.

FIG. 10 is a block diagram illustrating an RRC Connection Reconfiguration message 1070 structure. The RRC Connection Reconfiguration message 1070 may be referred to as RRCConnectionReconfiguration. The RRC Connection Reconfiguration message 1070 may include measurement configurations 1071 and the radio resources dedicated 1072.

Figure 11:
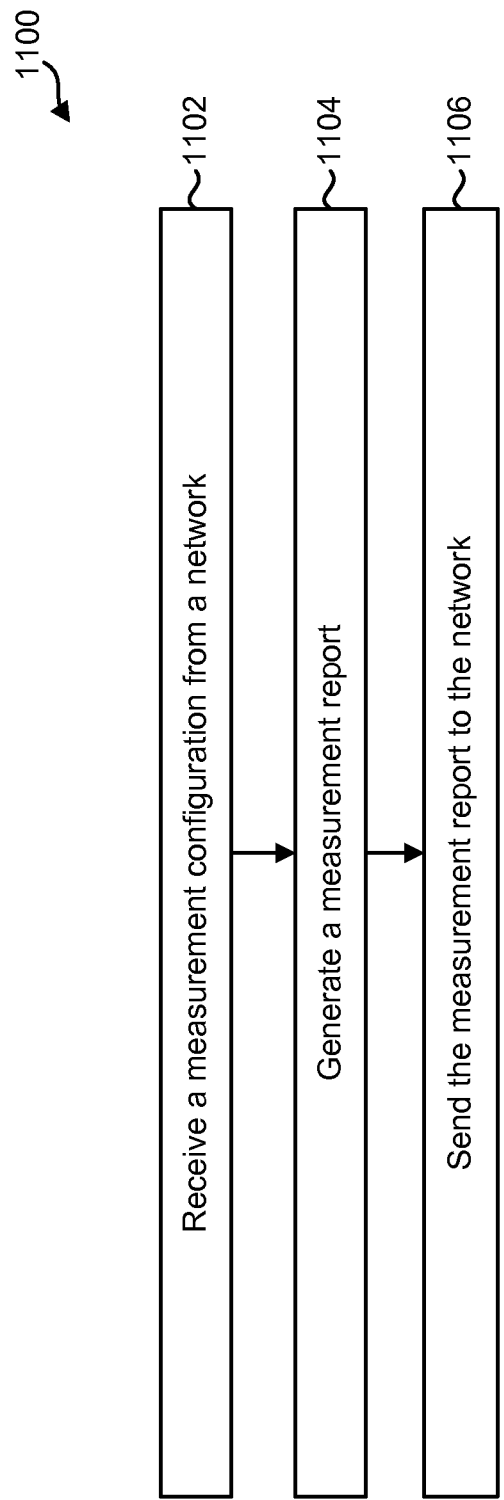
FIG. 11 is a flow diagram of a method for coordinated multipoint (CoMP) radio resource management (RRM) measurement.

FIG. 11 is a flow diagram of a method 1100 for coordinated multipoint (CoMP) radio resource management (RRM) measurement. The method 1100 may be performed by a user equipment (UE) 104. The user equipment (UE) 104 may keep a single measurement object 879 in a carrier frequency. The measurement object 879 may include a set of CSI-RS configurations in a measurement configuration 250 for the measurement of CSI-RSRP and/or CSI-RSRQ in the radio resource control (RRC) layer. The measurement object 879 may also include a set of CSI-RS configurations in a radio resource configuration for channel quality measurement and/or reporting in the physical layer. The measurement object 879 may further include a signal to indicate whether the measurement object 879 is concerned with the cell-specific reference signal (CRS) or the channel state information reference signal (CSI-RS) in a report configuration 880.

The user equipment (UE) 104 may receive 1102 a measurement configuration 250 from a network. In one configuration, the user equipment (UE) 104 may receive a measurement configuration 250 from an eNB 102. Using the measurement configuration 250, the user equipment (UE) 104 may generate 1104 a measurement report 252. More specifically, the user equipment (UE) 104 may generate coordinated multipoint (CoMP) radio resource management (RRM) measurements using the channel state information reference signal (CSI-RS) in addition to radio resource management (RRM) measurements using the cell-specific reference signal (CRS). The user equipment (UE) 104 may then send 1106 the measurement report 252 to the network.

Figure 12:
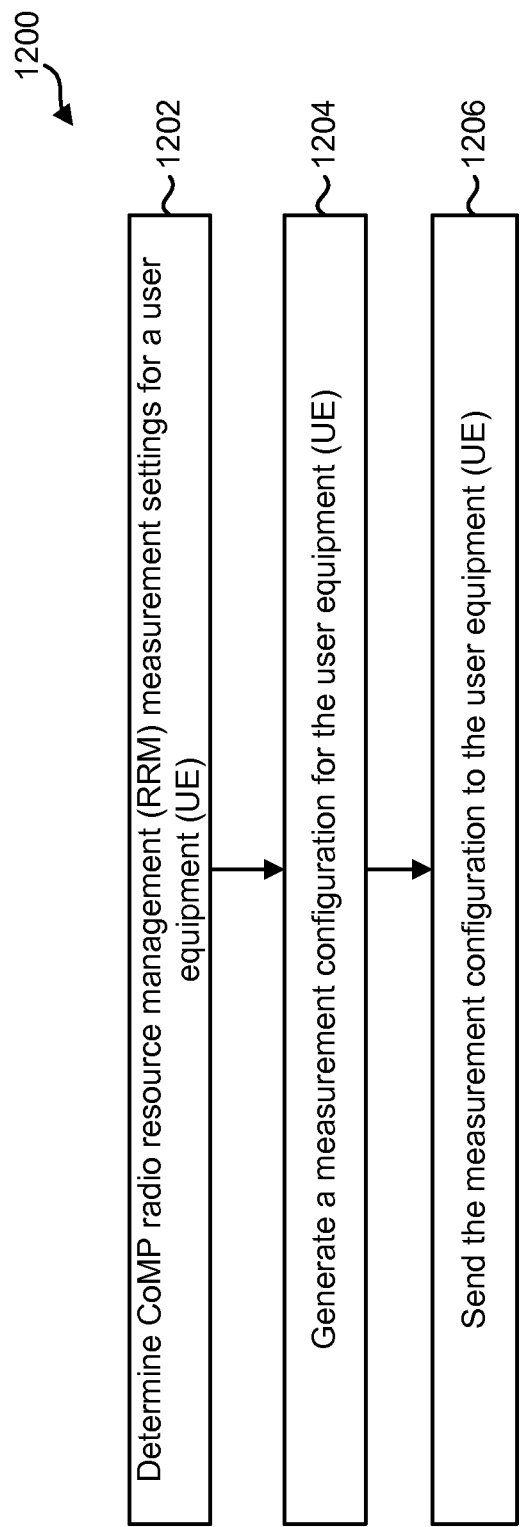
FIG. 12 is a flow diagram of a method for coordinating a coordinated multipoint (CoMP) radio resource management (RRM) measurement.

FIG. 12 is a flow diagram of a method for coordinating a coordinated multipoint (CoMP) radio resource management (RRM) measurement. The method 1200 may be performed by the network. For example, the method 1200 may be performed by an eNB 102. The network may determine 1202 radio resource management (RRM) measurement settings for a user equipment (UE) 104. The network may generate 1204 a measurement configuration 250 for the user equipment (UE). More specifically, the network may generate coordinated multipoint (CoMP) radio resource management (RRM) measurement settings using the channel state information reference signal (CSI-RS) in addition to radio resource management (RRM) measurement settings using the cell-specific reference signal (CRS). The network may then send 1206 the measurement configuration to the user equipment (UE).

Figure 13:
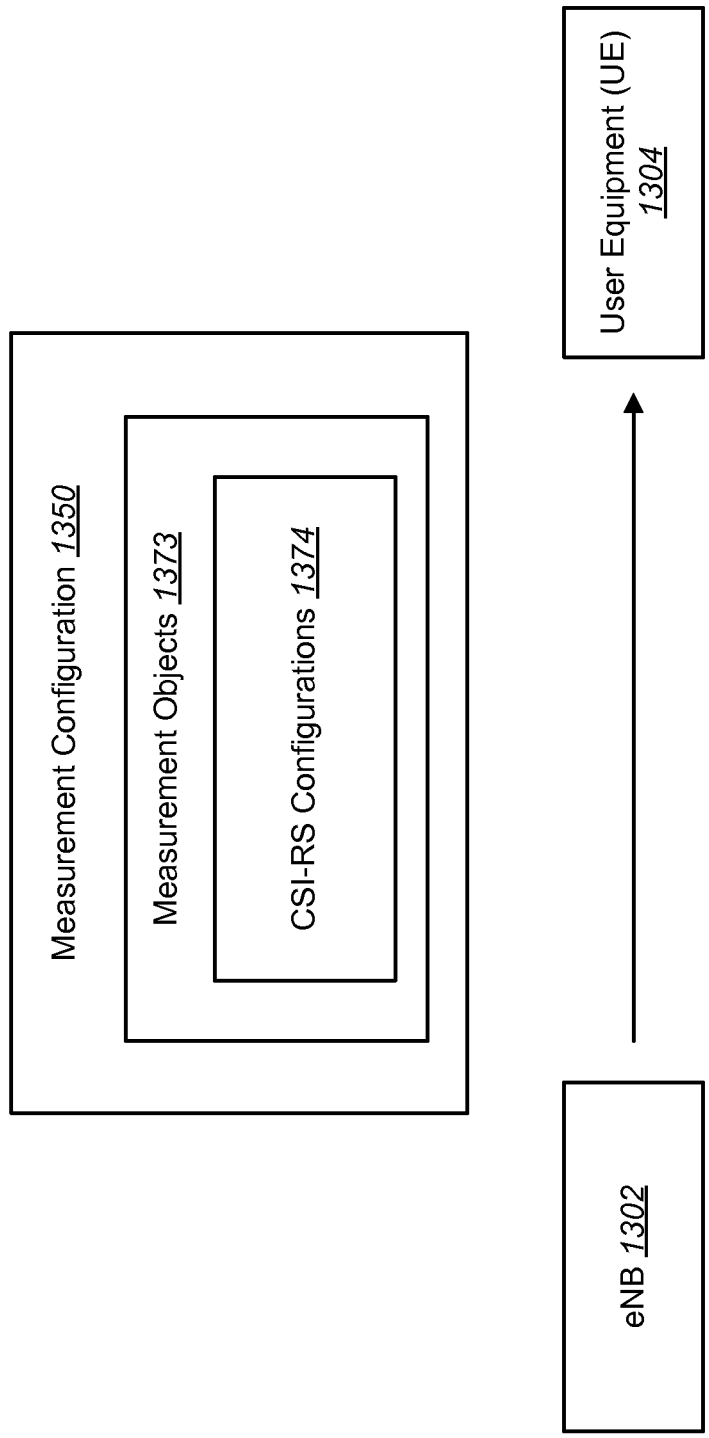
FIG. 13 illustrates the transmission of a measurement configuration from an eNB to a user equipment (UE)

FIG. 13 illustrates the transmission of a measurement configuration 1350 from an eNB 1302 to a user equipment (UE) 1304. The measurement configuration 1350 may include one or more measurement objects 1373. Each measurement object 1373 may include a set of CSI-RS configurations 1374. In one configuration, the measurement configuration 1350 may instruct the user equipment (UE) 1304 to change settings to measurement objects 1373. For example, the measurement configuration may instruct the user equipment (UE) 1304 to add, modify or remove CSI-RS configurations 1374 from the set of CSI-RS configurations 1374.

Figure 14:
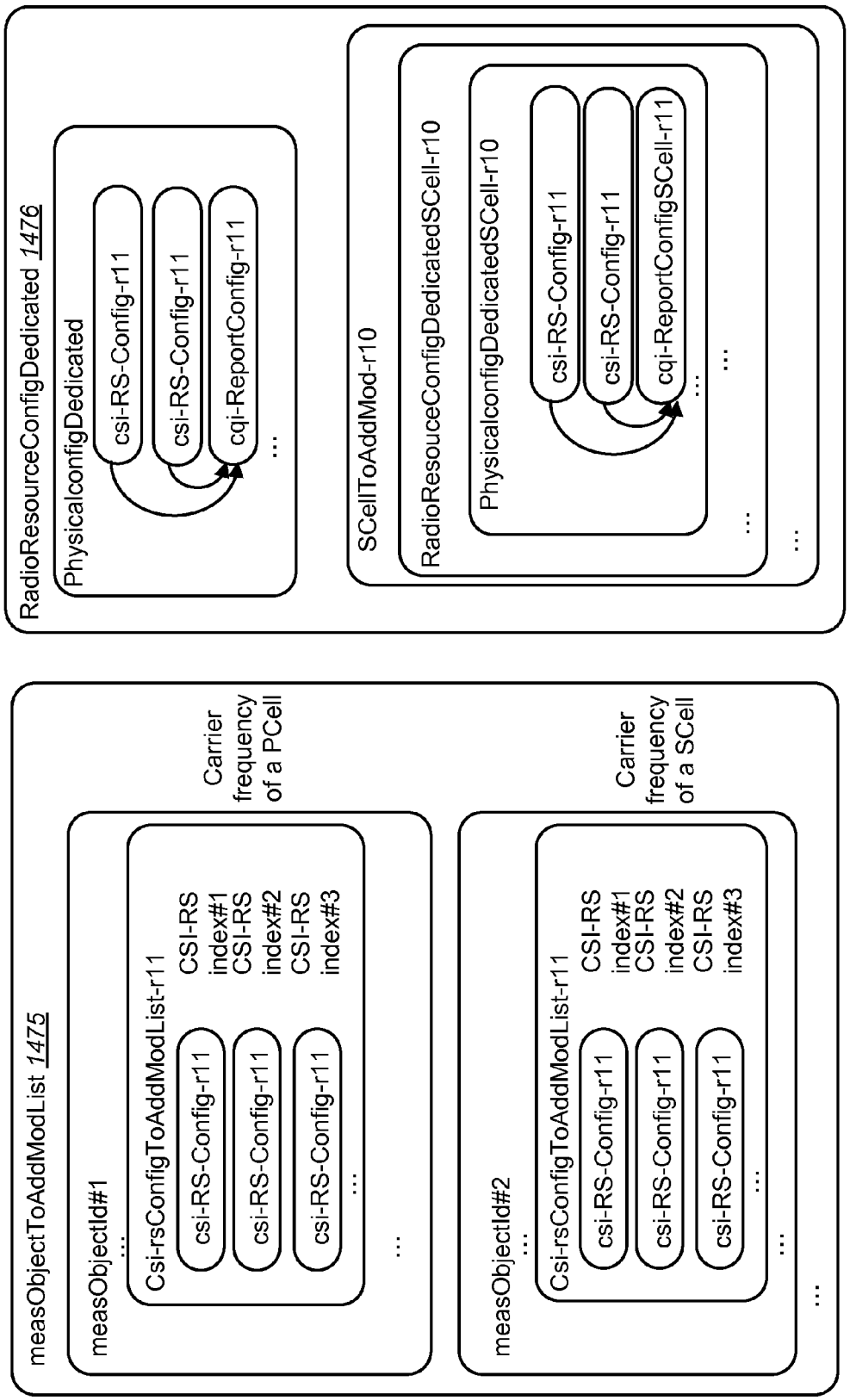
FIG. 14 is a block diagram illustrating an independent configuration for the channel state information reference signal (CSI-RS)

FIG. 14 is a block diagram illustrating an independent configuration for the channel state information reference signal (CSI-RS). To define channel state information reference signal (CSI-RS) based radio resource management (RRM) measurement, one or more sets of CSI-RS configurations 1374 are included in a measurement object 1373 configuration. Similar to a cell list (or neighbor cell list), the information element (IE) to add and modify a list of CSI-RS configurations 1374 and the information element (IE) to remove CSI-RS configurations 1374 may be included in a measurement object 1373. The eNB 102 may only configure a single measurement object 1373 for a given frequency.

Each measurement object 1373 may be specific to a carrier frequency and correspond to a cell-specific reference signal (CRS) based radio resource management (RRM) measurement (i.e., a normal radio resource management (RRM) measurement) in the carrier frequency. If the channel state information reference signals (CSI-RSs) are configured in the measurement object in the carrier frequency of a serving cell, the measurement object 1373 may also correspond to a channel state information reference signal (CSI-RS) based radio resource management (RRM) measurement (i.e., a coordinated multipoint (CoMP) radio resource management (RRM) measurement) in the carrier frequency of the serving cell. A channel state information reference signal (CSI-RS) radio resource management (RRM) measurement may be performed in the serving cell(s) where channel state information reference signals (CSI-RSs) are configured. Thus, one measurement object in one carrier frequency may be used.

As an example, in the measurement objects of a list 1475 of measurement objects to add, a list of CSI-RS configurations 1374 is included. These CSI-RS configurations 1374 may be used for channel state information reference signal (CSI-RS) based radio resource management (RRM) measurement. Independently, the list of CSI-RS configurations 1374 may be included in the physical configuration for a PCell and/or SCells. In the physical configuration of the radio resource configuration 1476, a CQI report configuration (cqi-ReportConfig-r11) in each serving cell may correspond to each CSI-RS configuration 1374 (csi-RS-Config-r11) in each serving cell. In one configuration, multiple csi-RS-Config-r11s may be linked to one cqi-ReportConfig-r11. In another configuration, multiple cqi-ReportConfig-R11s may be configured in each serving cell and each csi-RS-Config-r11 may be linked to each cqi-ReportConfig-R11.

Using an independent configuration for channel state information reference signal (CSI-RS) allows an eNB 102 to configure radio resource management (RRM) measurement and physical layer measurement independently. There may be no need to fix a coordinated multipoint (CoMP) measurement set 762 to a subset of a coordinated multipoint (CoMP) radio resource management (RRM) measurement set 763.

Figure 15:
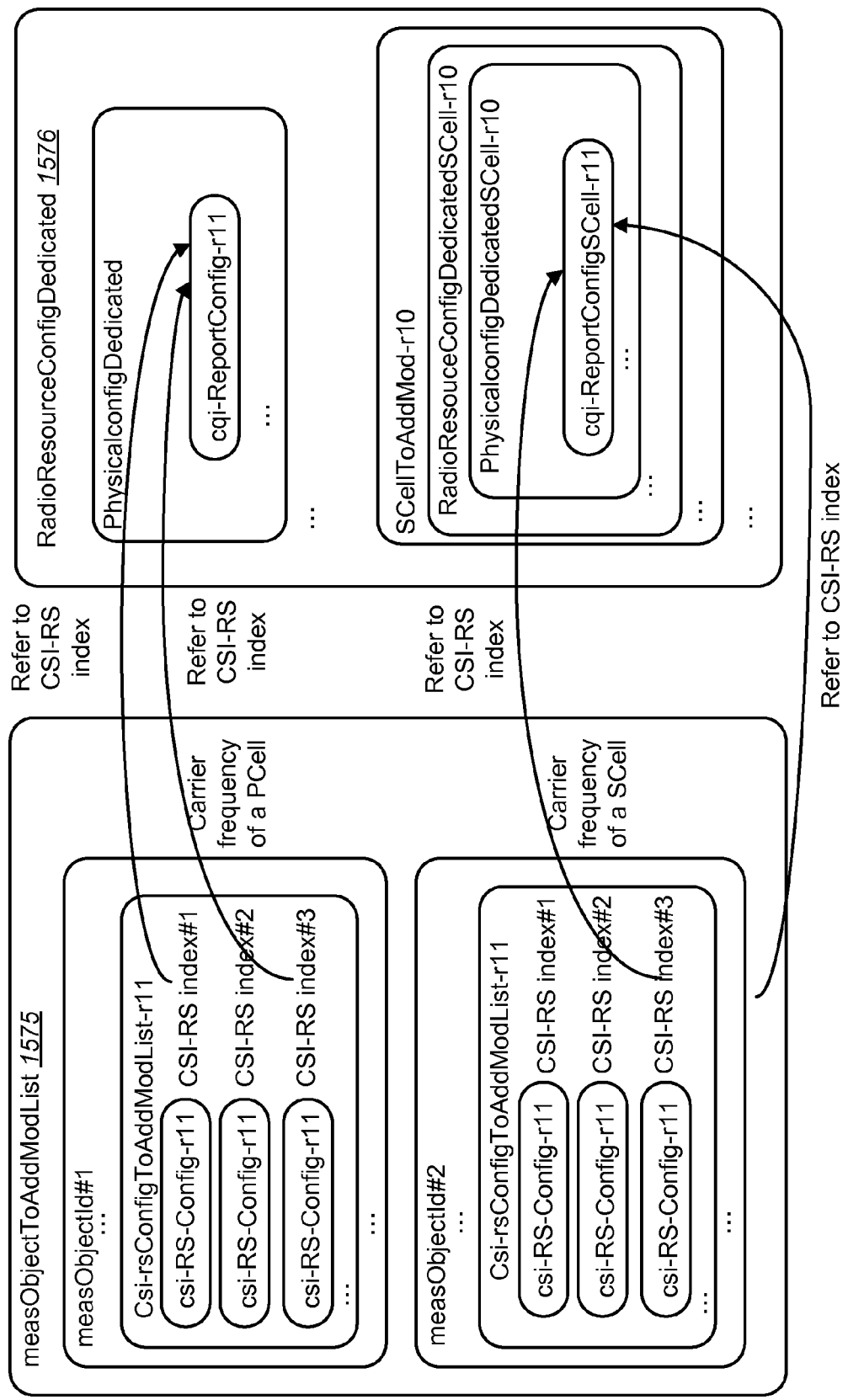
FIG. 15 is a block diagram illustrating an independent configuration for channel state information reference signal (CSI-RS)

FIG. 15 is a block diagram illustrating an independent configuration for channel state information reference signal (CSI-RS). The list of CSI-RS configurations 1374 may be included in a measurement object 1373. The CSI-RS configurations 1374 may be used by the user equipment (UE) 104 for a channel state information reference signal (CSI-RS) based radio resource management (RRM) measurement (i.e., coordinated multipoint (CoMP) radio resource management (RRM) measurement). For coordinated multipoint (CoMP) measurement, some of the CSI-RS configurations 1374 may be associated with csi-RS-Config-r11(s) (i.e., the channel state information reference signal (CSI-RS) indexes) that are configured in the physical configuration in each serving cell.

A command to add measurement objects to a list (measObjectToAddModList 1575) is shown. Multiple csi-RS-Config-r11s in a measurement object 879 may be linked to one cqi-ReportConfig-r11 in a physical configuration of a radio resource configuration 1576. In one configuration, multiple cqi-ReportConfig-r11s may be configured in each serving cell and each csi-RS-Config-r11 may be linked to each cqi-ReportConfig-r11. The eNB 102 may reduce overhead by avoiding multiple configurations of the channel state information reference signal (CSI-RS) for the radio resource management (RRM) measurement and the physical layer measurement. The coordinated multipoint (CoMP) measurement set 762 may then become a subset of the coordinated multipoint (CoMP) radio resource management (RRM) measurement set 763.

Figure 16:
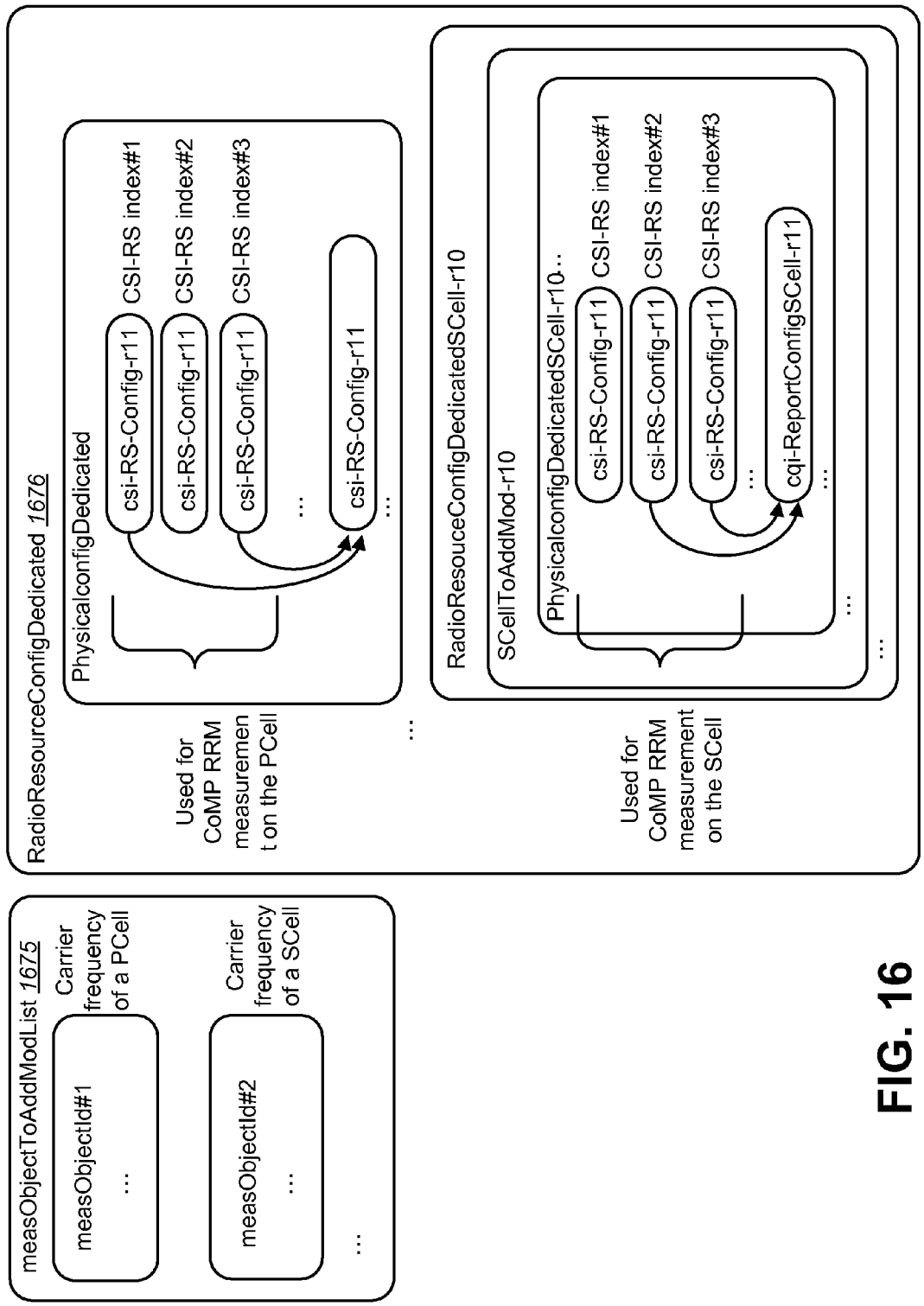
FIG. 16 is a block diagram illustrating a configuration for channel state information reference signal (CSI-RS) in the physical configuration.

FIG. 16 is a block diagram illustrating a configuration for channel state information reference signal (CSI-RS) in the physical configuration. More specifically, a command to add measurement objects 1373 to a list of measurement objects 1373 (measObjectToAddModList 1675) is illustrated along with the radio resource configuration 1676. To define a channel state information reference signal (CSI-RS) based radio resource management (RRM) measurement, one or more sets of CSI-RS configurations 1374 may be included in a physical configuration. If a measurement configuration 250 defines channel state information reference signal (CSI-RS) based radio resource management (RRM) and the measurement configuration 250 is associated with a measurement object 1373, the CSI-RS configurations 1374 of the carrier frequency of the measurement object 1373 may be used for a coordinated multipoint (CoMP) radio resource management (RRM) measurement. An information element (IE) to add and modify a list of CSI-RS configurations 1374 and an information element (IE) to remove CSI-RS configurations 1374 may be included in the physical configuration. Each measurement object 1373 may be specific to a carrier frequency and correspond to a cell-specific reference signal (CRS) based radio resource management (RRM) measurement in the carrier frequency.

If the channel state information reference signals (CSI-RSs) are configured in a physical configuration of a serving cell, the measurement object 1373 of the carrier frequency of the serving cell may also correspond to channel state information reference signal (CSI-RS) based radio resource management (RRM) measurement (i.e., coordinated multipoint (CoMP) radio resource management (RRM) measurement) in the carrier frequency of the serving cell. Coordinated multipoint (CoMP) radio resource management (RRM) measurement may be performed in serving cells where channel state information reference signals (CSI-RSs) are configured. Using the configuration for channel state information reference signal (CSI-RS) in the physical configuration may allow for only one measurement object 1373 in one carrier frequency to be used.

The list of CSI-RS configurations 1374 may be included in the physical configuration of each serving cell. The CSI-RS configurations 1374 may be used for coordinated multipoint (CoMP) radio resource management (RRM) measurement. Some of the CSI-RS configurations 1374 may be used for the coordinated multipoint (CoMP) measurement set 762, which is used for a channel state information (CSI) report in the physical layer. The cqi-ReportConfig-r11s in each serving cell may correspond to some of the csi-RS-Config-r11s configured in the physical configuration in each serving cell.

Multiple csi-RS-Config-r11s may be linked to one cqi-ReportConfig-r11. In one configuration, multiple cqi-ReportConfig-r11s may be configured in each serving cell and each csi-RS-Config-r11 may be linked to each cqi-ReportConfig-r11. The eNB 102 may reduce overhead by avoiding multiple configurations of the channel state information reference signal (CSI-RS) for the radio resource management (RRM) measurement and the physical layer measurement. The coordinated multipoint (CoMP) measurement set 762 may then become a subset of the coordinated multipoint (CoMP) radio resource management (RRM) measurement set 763.

Figure 17:
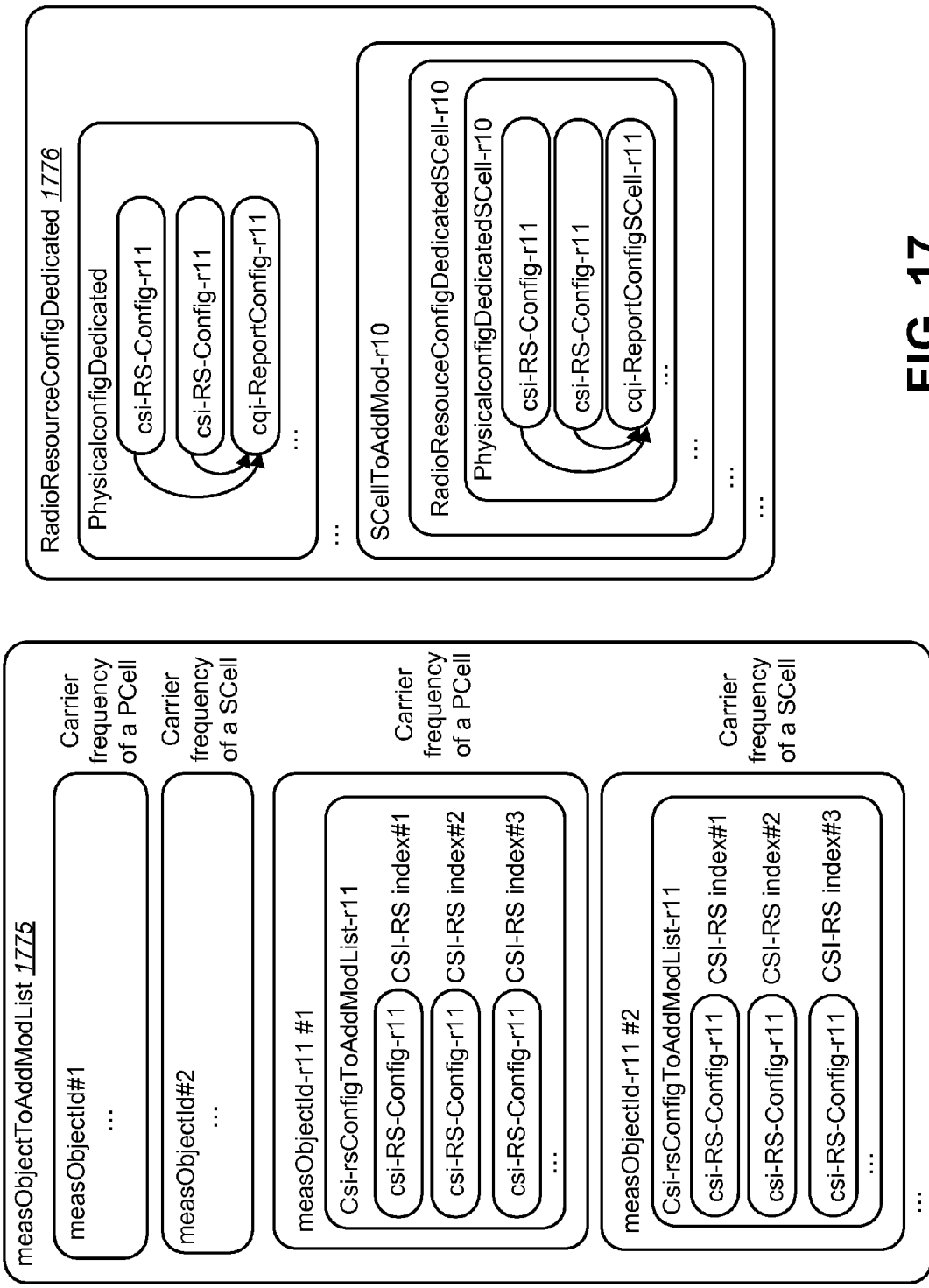
FIG. 17 is a block diagram illustrating a measurement object and independent configuration for channel state information reference signal (CSI-RS)

FIG. 17 is a block diagram illustrating a measurement object 1373 and independent configuration for channel state information reference signal (CSI-RS). More specifically, a command to add measurement objects 1373 to a list of measurement objects 1373 (measObjectToAddModList 1775) is illustrated along with the radio resource configuration 1776. To define channel state information reference signal (CSI-RS) based radio resource management (RRM) measurement, sets of CSI-RS configurations 1374 may be included in a measurement object configuration.

An information element (IE) to add and modify a list of CSI-RS configurations 1374 and an information element (IE) to remove CSI-RS configurations 1374 may be included in a measurement object 1373, which is different than a measurement object 1373 for cell-specific reference signal (CRS) based radio resource management (RRM) measurement in a carrier frequency. The eNB 102 may configure a single measurement object 1373 for cell-specific reference signal (CRS) based radio resource management (RRM) measurement for a given frequency and a single measurement object 1373 for channel state information reference signal (CSI-RS) based radio resource management (RRM) measurement for a given frequency. Each measurement object 1373 may be specific to a carrier frequency and correspond to cell-specific reference signal (CRS) based radio resource management (RRM) measurement in the carrier frequency or channel state information reference signal (CSI-RS) based radio resource management (RRM) measurement in the carrier frequency. If the measurement ID (measID) 878 links to a measurement object 879 for CSI-RS, channel state information reference signal (CSI-RS) based radio resource management (RRM) measurement may be performed in the serving cells. The RRC may then keep existing cell-specific reference signal (CRS) based radio resource management (RRM) measurements as currently defined while also managing channel state information reference signal (CSI-RS) based radio resource management (RRM) measurement.

A list of CSI-RS configurations 1374 may be included in a new measurement object 1373 in a carrier frequency of a serving cell. The CSI-RS configurations 1374 may be used for channel state information reference signal (CSI-RS) based radio resource management (RRM) measurement. The list of CSI-RS configurations 1374 for a coordinated multipoint (CoMP) measurement set 672 may be included in the physical configuration of a PCell and/or SCells. The coordinated multipoint (CoMP) measurement set 672 may be used for the channel state information (CSI) report in the physical layer.

One or more cqi-ReportConfig-r11s in each serving cell may correspond to one or more csi-RS-Config-r11s configured in the physical configuration in each serving cell. Multiple csi-RS-Config-r11s may be linked to one cqi-ReportConfig-r11. In one configuration, multiple cqi-ReportConfig-r11s may be configured in each serving cell and each csi-RS-Config-r11 may be linked to each cqi-ReportConfig-r11.

Figure 18:
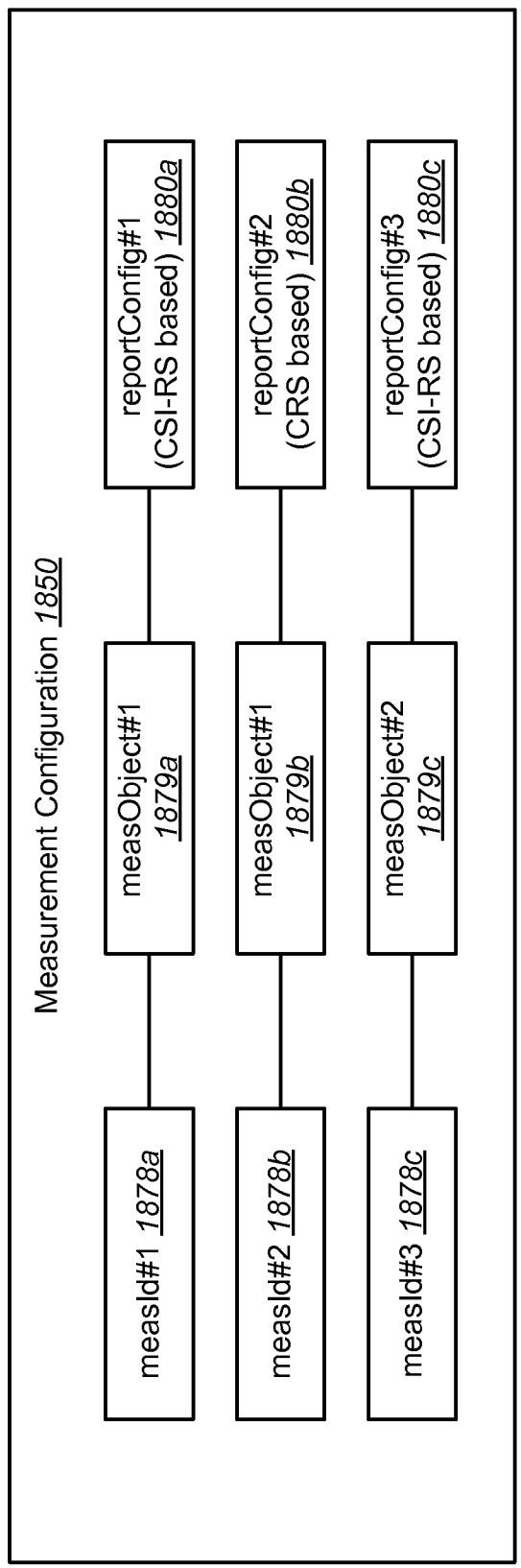
FIG. 18 is a block diagram illustrating how a report configuration may indicate that a measurement ID in a measurement configuration is cell-specific reference signal (CRS) based or channel state information reference signal (CSI-RS) based.

FIG. 18 is a block diagram illustrating how a report configuration 1880a-c may indicate that a measurement ID 1878a-c in a measurement configuration 1850 is cell-specific reference signal (CRS) based or channel state information reference signal (CSI-RS) based. Each measurement ID (measID) 1878a-c may be linked to either cell-specific reference signal (CRS) or channel state information reference signal (CSI-RS). In Rel-10, measID 1878 may only be linked to cell-specific reference signal (CRS) based radio resource management (RRM) measurements. When a measurement ID 1878 is signaled, the measurement ID 1878 may be associated with a measurement object ID 1879a-c and a report configuration ID 1880a-c.

When sets of CSI-RS configurations 1374 are included in a measurement object configuration or a physical configuration, the measurement object 1850 does not specify whether it is for cell-specific reference signal (CRS) or channel state information reference signal (CSI-RS). Therefore, each report configuration 1880 may include an indication of whether the report configuration 1880 is for cell-specific reference signal (CRS) or channel state information reference signal (CSI-RS). The indication in the report configuration 1880 may be one or more new event identities with a different identity than other cell-specific reference signal (CRS) based events. An event identity may identify measurement reporting events (i.e., the current list of events A1-A6 is discussed above in relation to FIG. 2). Events A1-A6 are defined as events based on measurement results of the cell-specific reference signal (CRS) of the serving cell and/or the neighbor cell. In addition, events based on the measurement results of the channel state information reference signals (CSI-RSs) (of the serving cell and/or the neighbor cell) and/or the cell-specific reference signal (CRS) (of the serving cell and/or the neighbor cell) may be used.

The indication may instead be an explicit indication {CRS, CSI-RS}. The explicit indication may be {CRS, CSI-RS, both}, where "both" means both the cell-specific reference signal (CRS) and the channel state information reference signals (CSI-RSs). The explicit indication may be add-CSI-RS-report {setup} to indicate whether the measurement report should include the measurement results of CSI-RS(s). When a measurement ID (measID) 1878 is signaled, a measurement object (measObject) 1879 and a report configuration (reportConfig) 1880 are associated with the measurement ID 1878. Therefore, the report configuration 1880 can define whether the measurement ID 1878 is for channel state information reference signal (CSI-RS) based radio resource management (RRM) measurement or cell-specific reference signal (CRS) based radio resource management (RRM) measurement. An explicit or implicit indication may also be used in configurations where sets of CSI-RS configurations 1374 are included in a measurement object configuration.

Figure 19:
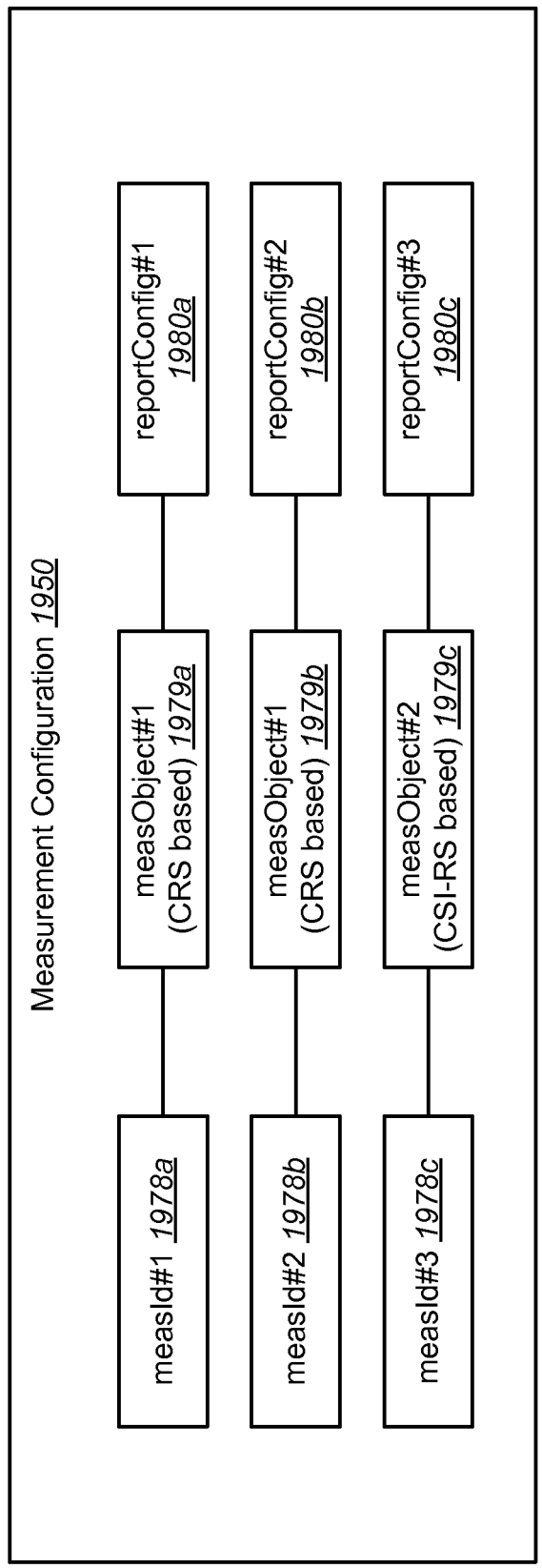
FIG. 19 is a block diagram illustrating how a measurement object 1979*a-c* may indicate that a measurement ID in a measurement configuration is for cell-specific reference signal (CRS) or channel state information reference signal (CSI-RS)

FIG. 19 is a block diagram illustrating how a measurement object 1979a-c may indicate that a measurement ID 1978a-c in a measurement configuration 1950 is for cell-specific reference signal (CRS) or channel state information reference signal (CSI-RS). Each measurement ID (measID) 1978 may be linked to either cell-specific reference signal (CRS) or channel state information reference signal (CSI-RS). When a measurement ID 1978 is signaled, the measurement ID 1978 may be associated with a measurement object ID 1979 and a report configuration ID 1980a-c. In one configuration, whether the measurement object 1979 is associated with the cell-specific reference signal (CRS) or the channel state information reference signal (CSI-RS) may identify whether the measurement ID 1978 is for cell-specific reference signal (CRS) based radio resource management (RRM) measurement and/or for channel state information reference signal (CSI-RS) based radio resource management (RRM) measurement.

The quantities of the PCell 107a (RSRP and/or RSRQ) are included in the radio resource management (RRM) measurement report 122. The quantities of the SCell(s) 107b are included in the radio resource management (RRM) measurement report 122 if the SCell(s) 107b are configured (i.e. if the carrier aggregation is configured). The quantities of CSI-RS(s) of the PCell 107a (CSI-RSRP and/or CSI-RSRP) may also be included in the radio resource management (RRM) measurement report 122. The quantities of CSI-RS(s) of the SCell(s) 107b may be included in the radio resource management (RRM) measurement report 122 if the SCell(s) 107b are configured. Therefore, one radio resource management (RRM) measurement report 122 may include the quantities of the PCell 107a, the quantities of the SCell(s) 107b, the quantities of CSI-RS(s) of the PCell 107a and/or the quantities of CSI-RS(s) of the SCell(s) 107b. One radio resource management (RRM) measurement report 122 may include the quantities of each of multiple CSI-RSs in one serving cell. One radio resource management (RRM) measurement report 122 may also include the quantities of each of multiple-CSI-RSs in each of multiple serving cells.

Conditions when the quantities of CSI-RS(s) are included in the measurement result may be further defined. One example is to include the quantities of any of the configured (or listed) CSI-RS(s) of any serving cell(s) whenever CSI-RS(s) are configured in a measurement configuration 250. Another example is to include the quantities of any of the configured (or listed) CSI-RS(s) of any serving cell(s) whenever a measurement object associated with a concerned measID includes a CSI-RS. Yet another example is to include the quantities of any of the configured (or listed) CSI-RS(s) of serving cell(s) corresponding to a carrier frequency of a measurement object whenever the measurement object associated with a concerned measID includes a CSI-RS. Yet another example is to include the quantities of any of the configured (or listed) CSI-RS(s) of any of the serving cell(s) whenever a report configuration (or a measurement event type) associated with a concerned measID is related to a CSI-RS. Yet another example is to include the quantities of any of the configured (or listed) CSI-RS(s) of serving cell(s) corresponding to a carrier frequency of a measurement object that corresponds to a measID whenever a report configuration (or a measurement event type) associated with the concerned measID is related to a CSI-RS.

Another example is to include the quantities of the best configured (or listed) CSI-RS(s) of any serving cell(s) (up to a maximum reporting number of CSI-RS(s)) whenever CSI-RS(s) are configured in a measurement configuration 250. The maximum reporting number of CSI-RSs may be configured in a report configuration. Yet another example is to include the quantities of the best configured (or listed) CSI-RS(s) of any serving cell(s) (up to a maximum reporting number of CSI-RS(s)) whenever a measurement object associated with a concerned measID includes a CSI-RS. Another example is to include the quantities of the best configured (or listed) CSI-RS(s) of serving cell(s) (up to a maximum reporting number of CSI-RS(s)) corresponding to a carrier frequency of a measurement object whenever the measurement object associated with a concerned measID includes a CSI-RS. Yet another example is to include the quantities of the best configured (or listed) CSI-RS(s) of any of the serving cell(s) (up to a maximum reporting number of CSI-RS(s)) whenever a report configuration (or a measurement event type) associated with a concerned measID is related to a CSI-RS. Yet another example is to include the quantities of any of the best configured (or listed) CSI-RS(s) of serving cell(s) (up to a maximum reporting number of CSI-RS(s)) corresponding to a carrier frequency of a measurement object that correponds to a measID whenever a report configuration (or a measurement event type) associated with the concerned measID is related to a CSI-RS. For those examples, the best configured (or listed) CSI-RS(s) may be listed in each serving cell and may be decided by the user equipment (UE) 104 based on the reference signal received power (RSRP) and/or reference signal received quality (RSRQ) of the configured (or listed) CSI-RS(s) measured in each serving cell.

Another example is to include the quantities of CSI-RS(s) of any serving cell(s) that fulfilled a trigger condition whenever CSI-RS(s) are configured in a measurement configuration 250. Yet another example is to include the quantities of CSI-RS(s) of any serving cell(s) that fulfilled a trigger condition whenever a measurement object associated with a concerned measID includes a CSI-RS. Another example is to include the quantities of CSI-RS(s) of any serving cell(s) that fulfilled a trigger condition corresponding to a carrier frequency of a measurement object whenever the measurement object associated with a concerned measID includes a CSI-RS. Yet another example is to include the quantities of CSI-RS(s) of any serving cell(s) that fulfilled a trigger condition whenever a report configuration (or a measurement event type) associated with a concerned measID is related to a CSI-RS.

Yet another example is to include the quantities of CSI-RS(s) of serving cell(s) that fulfilled a trigger condition corresponding to a carrier frequency of a measurement object that corresponds to a measID whenever a report configuration (or a measurement event type) associated with the concerned measID is related to a CSI-RS. For those examples, whether the trigger condition is fulfilled or not may be decided in each serving cell by the user equipment (UE) 104 based on the reference signal received power (RSRP) and/or reference signal received quality (RSRQ) of a CSI-RS measured in each serving cell.

By these methods, one benefit is that the eNB 102 and the user equipment (UE) 104 can operate efficiently and sustainably in scenarios where CSI-RS based radio resource management (RRM) measurement is used in addition to CRS based radio resource management (RRM) measurement. The eNB 102 can measure more detail of the channels associated with the user equipment (UE) 104. Also CSI-RS based radio resource management (RRM) measurement can be used even when multiple serving cells are configured.

The cell-specific reference signal (CRS) may also be referred to as the common reference signal (RS). The coordinated multipoint (CoMP) radio resource management (RRM) measurement set 763 may also be referred to as the coordinated multipoint (CoMP) Resource management Set (CRMS). The radio resource management (RRM) measurement report 122 may also be referred to as the measurement report or the measurement report in the radio resource control (RRC) layer 353. The CSI-RSRP may also be referred to as the CSI-RS RSRP. The CSI-RSRQ may also be referred to as the CSI-RS RSRQ. Further, the various names used for the described parameters and signal elements (e.g., CSI-RS, CRS, csi-RS-Config-r11, etc.) are not intended to be limiting in any respect, as these parameters and signal elements may be identified by any suitable names.

Figure 20:
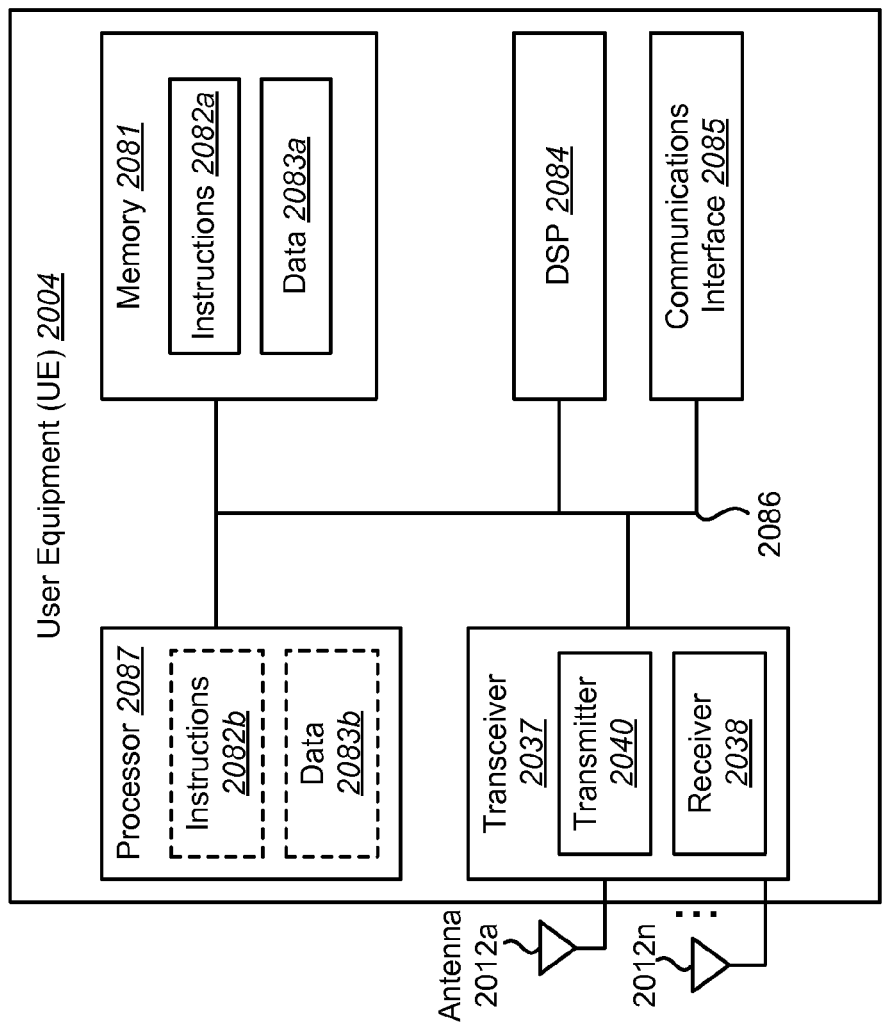
FIG. 20 illustrates various components that may be utilized in a user equipment (UE)

FIG. 20 illustrates various components that may be utilized in a user equipment (UE) 2004. The user equipment (UE) 2004 may be utilized as the user equipment (UE) 104 illustrated previously. The user equipment (UE) 2004 includes a processor 2087 that controls operation of the user equipment (UE) 2004. The processor 2087 may also be referred to as a CPU. Memory 2081, which may include both read-only memory (ROM), random access memory (RAM) or any type of device that may store information, provides instructions 2082a and data 2083a to the processor 2087. A portion of the memory 2081 may also include non-volatile random access memory (NVRAM). Instructions 2082b and data 2083b may also reside in the processor 2087. Instructions 2082b and/or data 2083b loaded into the processor 2087 may also include instructions 2082a and/or data 2083a from memory 2081 that were loaded for execution or processing by the processor 2087. The instructions 2082b may be executed by the processor 2087 to implement the systems and methods disclosed herein.

The user equipment (UE) 2004 may also include a housing that contains a transmitter 2040 and a receiver 2038 to allow transmission and reception of data. The transmitter 2040 and receiver 2038 may be combined into a transceiver 2037. One or more antennas 2012a-n are attached to the housing and electrically coupled to the transceiver 2037.

The various components of the user equipment (UE) 2004 are coupled together by a bus system 2086, which may include a power bus, a control signal bus, and a status signal bus, in addition to a data bus. However, for the sake of clarity, the various buses are illustrated in FIG. 20 as the bus system 2086. The user equipment (UE) 2004 may also include a digital signal processor (DSP) 2084 for use in processing signals. The user equipment (UE) 2004 may also include a communications interface 2085 that provides user access to the functions of the user equipment (UE) 2004. The user equipment (UE) 2004 illustrated in FIG. 20 is a functional block diagram rather than a listing of specific components.

Figure 21:
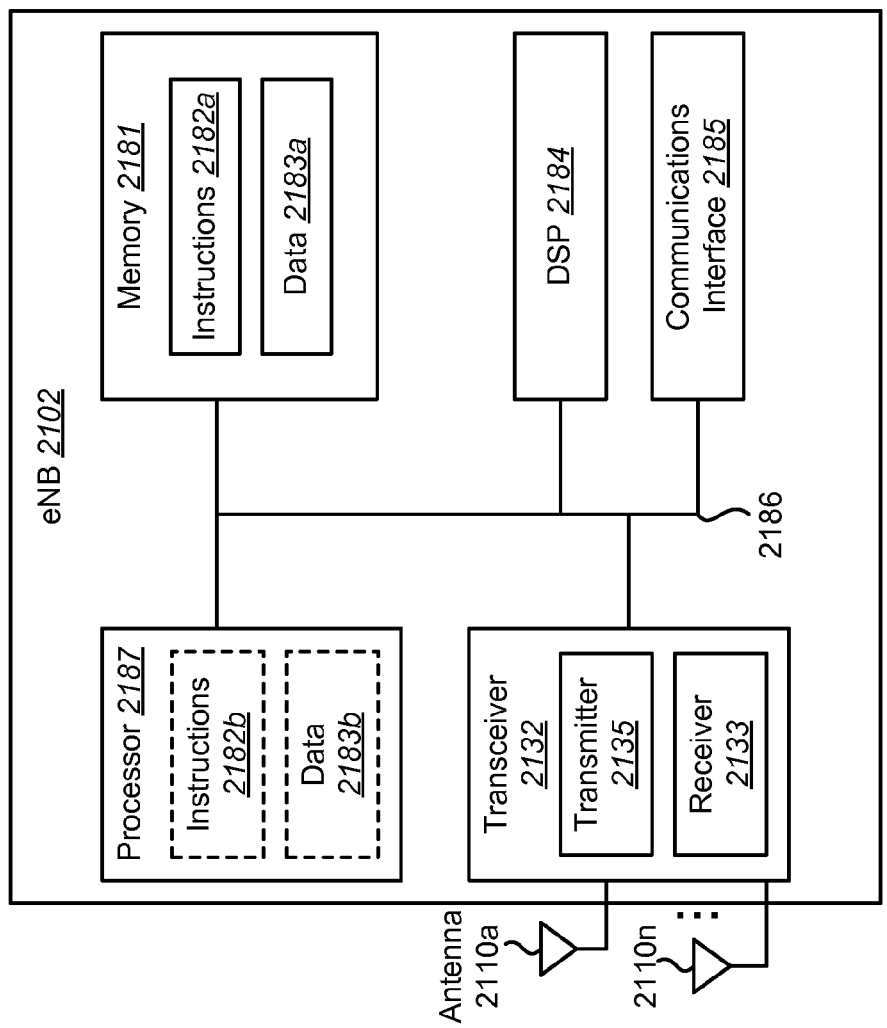
FIG. 21 illustrates various components that may be utilized in an eNB.

FIG. 21 illustrates various components that may be utilized in an eNB 2102. The eNB 2102 may be utilized as the eNB 102 illustrated previously. The eNB 2102 may include components that are similar to the components discussed above in relation to the user equipment (UE) 2004, including a processor 2187, memory 2181 that provides instructions 2182a and data 2183a to the processor 2187, instructions 2182b and data 2183b that may reside in or be loaded into the processor 2187, a housing that contains a transmitter 2135 and a receiver 2133 (which may be combined into a transceiver 2132), one or more antennas 2110a-n electrically coupled to the transceiver 2132, a bus system 2186, a DSP 2184 for use in processing signals, a communications interface 2185 and so forth.

Figure 22:
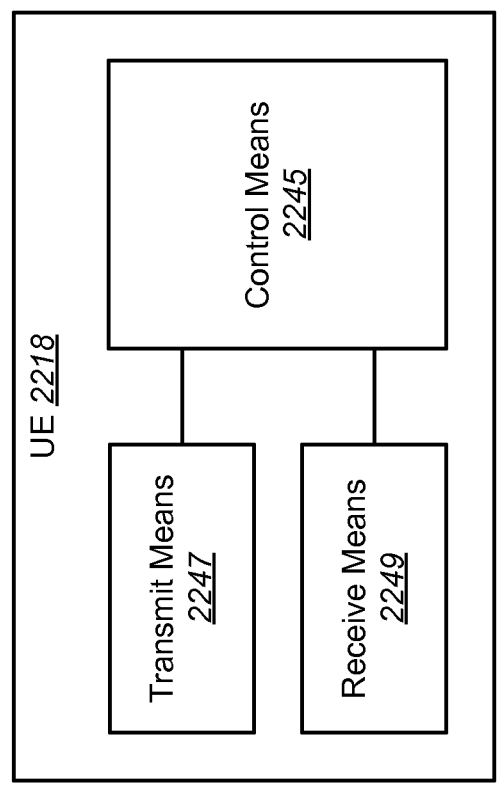
FIG. 22 is a block diagram illustrating one configuration of a UE in which systems and methods for coordinated multipoint (CoMP) radio resource management (RRM) measurement may be implemented.

FIG. 22 is a block diagram illustrating one configuration of a UE 2218 in which systems and methods for coordinated multipoint (CoMP) radio resource management (RRM) measurement may be implemented. The UE 2218 includes transmit means 2247, receive means 2249 and control means 2245. The transmit means 2247, receive means 2249 and control means 2245 may be configured to perform one or more of the functions described in connection with FIG. 11 and FIG. 20 above. FIG. 20 above illustrates one example of a concrete apparatus structure of FIG. 22. Other various structures may be implemented to realize one or more of the functions of FIG. 11 and FIG. 20. For example, a DSP may be realized by software.

Figure 23:
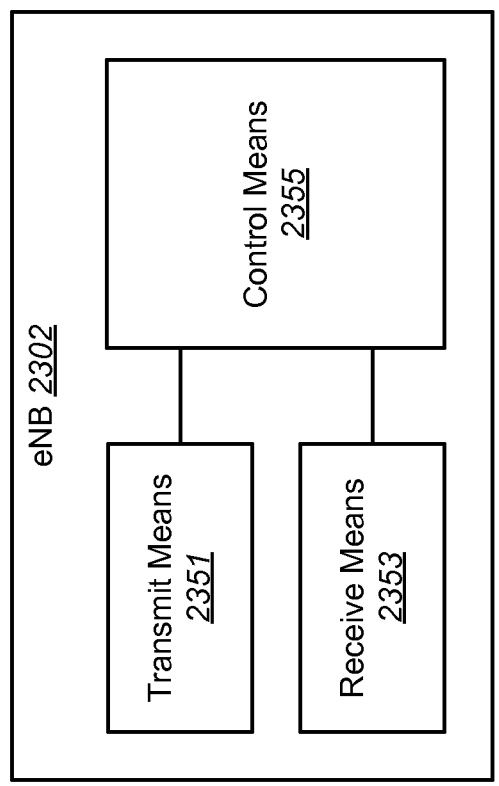
FIG. 23 is a block diagram illustrating one configuration of an eNB in which systems and methods for coordinated multipoint (CoMP) radio resource management (RRM) measurement may be implemented.

FIG. 23 is a block diagram illustrating one configuration of an eNB 2302 in which systems and methods for coordinated multipoint (CoMP) radio resource management (RRM) measurement may be implemented. The eNB 2302 includes transmit means 2351, receive means 2353 and control means 2355. The transmit means 2351, receive means 2353 and control means 2355 may be configured to perform one or more of the functions described in connection with FIGS. 12 and 21 above. FIG. 21 above illustrates one example of a concrete apparatus structure of FIG. 23. Other various structures may be implemented to realize one or more of the functions of FIGS. 11 and 21. For example, a DSP may be realized by software.

Unless otherwise noted, the use of '/' above represents the phrase "and/or."

The functions described herein may be implemented in hardware, software, firmware or any combination thereof. If implemented in software, the functions may be stored as one or more instructions on a computer-readable medium. The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory may be integral to a processor and still be said to be in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

Software or instructions may also be transmitted over a transmission medium. For example, if the software is transmitted from a website, server, or other remote source using a coaxial cable, fiber optic cable, twisted pair, digital subscriber line (DSL) or wireless technologies such as infrared, radio, and microwave, then the coaxial cable, fiber optic cable, twisted pair, DSL, or wireless technologies such as infrared, radio and microwave are included in the definition of transmission medium.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method performed by a user equipment (UE), comprising:
    receiving a measurement configuration from an evolved Node B (eNB), wherein the measurement configuration comprises a measurement object in a carrier frequency and the measurement object comprises a set of channel state information reference signal (CSI-RS) configurations;
    performing a measurement based on a cell-specific reference signal (CRS);
    performing a measurement based on a channel state information reference signal (CSI-RS) based on the measurement configuration;
    generating a measurement report in a radio resource control (RRC) layer; and
    sending the measurement report to the eNB.

2. The method of claim 1, wherein the measurement configuration comprises a measurement object, and wherein the measurement object comprises an information element configured to perform at least one of adding a CSI-RS configuration to the set of CSI-RS configurations, modifying a CSI-RS configuration of the set of CSI-RS configurations and removing a CSI-RS configuration from the set of CSI-RS configurations.

3. The method of claim 1, wherein the measurement configuration comprises multiple measurement objects.

4. A method performed by an evolved Node B (eNB), comprising:
generating a measurement configuration for a user equipment (UE), wherein the measurement configuration comprises a measurement object in a carrier frequency and the measurement object comprises a set of channel state information reference signal (CSI-RS) configurations;
sending the measurement configuration to the UE; and
receiving, from the UE, the measurement report generated based on a measurement based on a channel state information reference signal (CSI-RS) based on the measurement configuration.

5. The method of claim 4, wherein the measurement configuration comprises a measurement object, and wherein the measurement object comprises an information element configured to perform at least one of adding a CSI-RS configuration to the set of CSI-RS configurations, modifying a CSI-RS configuration of the set of CSI-RS configurations and removing a CSI-RS configuration from the set of CSI-RS configurations.

6. The method of claim 4, wherein the measurement configuration comprises multiple measurement objects.

7. A user equipment (UE) comprising:
a processor;
memory in electronic communication with the processor;
instructions stored in the memory, the instructions being executable to:
receive a measurement configuration from an evolved Node B (eNB), wherein the measurement configuration comprises a measurement object in a carrier frequency and the measurement object comprises a set of channel state information reference signal (CSI-RS) configurations;
perform a measurement based on a cell-specific reference signal (CRS);
perform a measurement based on a channel state information reference signal (CSI-RS) based on the measurement configuration;
generate a measurement report in a radio resource control (RRC) layer; and
send the measurement report to the eNB.

8. The UE of claim 7, wherein the measurement configuration comprises a measurement object, and wherein the measurement object comprises an information element configured to perform at least one of adding a CSI-RS configuration to the set of CSI-RS configurations, modifying a CSI-RS configuration of the set of CSI-RS configurations and removing a CSI-RS configuration from the set of CSI-RS configurations.

9. The UE of claim 7, wherein the measurement configuration comprises multiple measurement objects.

10. An evolved NodeB (eNB) comprising:
a processor;
memory in electronic communication with the processor;
instructions stored in the memory, the instructions being executable to:
generate a measurement configuration for a user equipment (UE), wherein the measurement configuration comprises a measurement object in a carrier frequency and the measurement object comprises a set of channel state information reference signal (CSI-RS) configurations;
send the measurement configuration to the UE; and
receive, from the UE, the measurement report generated based on a measurement based on a channel state information reference signal (CSI-RS) based on the measurement configuration.

11. The eNB of claim 10, wherein the measurement configuration comprises a measurement object, and wherein the measurement object comprises an information element configured to perform at least one of adding a CSI-RS configuration to the set of CSI-RS configurations, modifying a CSI-RS configuration of the set of CSI-RS configurations and removing a CSI-RS configuration from the set of CSI-RS configurations.

12. The eNB of claim 10, wherein the measurement configuration comprises multiple measurement objects.

* * * * *